United States Patent [19]
Katou et al.

[11] Patent Number: 5,929,591
[45] Date of Patent: Jul. 27, 1999

[54] AIR CONDITIONER

[75] Inventors: Kouji Katou; Toru Inoue, both of Shimotsuga-gun; Makoto Ishii, Utsunomiya; Yuhachi Takakura, Oyama; Yasuo Notohara, Hitachioota; Yukio Kawabata, Hitachinaka; Hiroshi Shinozaki, Shimotsuga-gun; Hiroo Nakamura, Tsuchiura; Shoji Takaku; Motoo Morimoto, both of Shimotsuga-gun, all of Japan

[73] Assignee: Hitachi, Ltd., Tokyo, Japan

[21] Appl. No.: 08/895,033

[22] Filed: Jul. 16, 1997

[30] Foreign Application Priority Data

| Jul. 16, 1996 | [JP] | Japan | 8-186416 |
| Oct. 4, 1996 | [JP] | Japan | 8-264453 |
| Oct. 4, 1996 | [JP] | Japan | 8-264713 |

[51] Int. Cl.$^6$ ................................ H02P 5/40
[52] U.S. Cl. .................. 318/723; 318/798; 318/808; 318/254; 62/89; 62/209
[58] Field of Search .................. 318/723, 808, 318/254, 722, 798; 62/180, 89.23, 158, 228.1, 228.4, 209; 417/45, 22, 42

[56] References Cited

U.S. PATENT DOCUMENTS

| 4,686,834 | 8/1987 | Haley et al. ................ 62/209 |
| 4,726,738 | 2/1988 | Nakamura et al. ........... 417/22 |
| 4,736,143 | 4/1988 | Nakamura et al. ........... 318/432 |
| 4,856,286 | 8/1989 | Sulfstedo et al. ............ 62/89 |
| 4,879,502 | 11/1989 | Endo et al. ................. 318/723 |
| 5,519,301 | 5/1996 | Yoshida et al. . |

FOREIGN PATENT DOCUMENTS

| 0486875 | 5/1992 | European Pat. Off. . |
| 0521467 | 1/1993 | European Pat. Off. . |
| 0652634 | 10/1995 | European Pat. Off. . |

*Primary Examiner*—Paul Ip
*Attorney, Agent, or Firm*—Antonelli, Terry, Stout & Kraus, LLP

[57] ABSTRACT

For achieving an air conditioner being applicable to various a-c source voltages in common and operative with high power factor by suppressing generation of high harmonics, an a-c source voltage from an a-c electric power source 1 is rectified in full-wave by a rectifier 2, and a d-c source voltage Ed of an inverter 13 is obtained by being charged in a condenser 5. Here, there are a-c source voltages of 100 V and 200 V, and a divided voltage Ed1 of the d-c voltage of the condenser 5 is selected when the a-c source voltage is 100 V, a divided voltage Ed2 (here, Ed1>Ed1) of the d-c voltage of the condenser 5 is selected when the a-c source voltage is 200 V, respectively by an exchange switch 18, and is used as a d-c voltage Ed' for controlling on and off of a switch element 6. Though the d-c source voltage Ed differs depending on the a-c source voltage of 100 V or 200 V, it is possible to set the d-c source voltage Ed at a voltage value for operating the inverter 13 with low loss and high efficiency, for each one of the a-c source voltages, by setting a ratio of the voltage division appropriately.

25 Claims, 21 Drawing Sheets

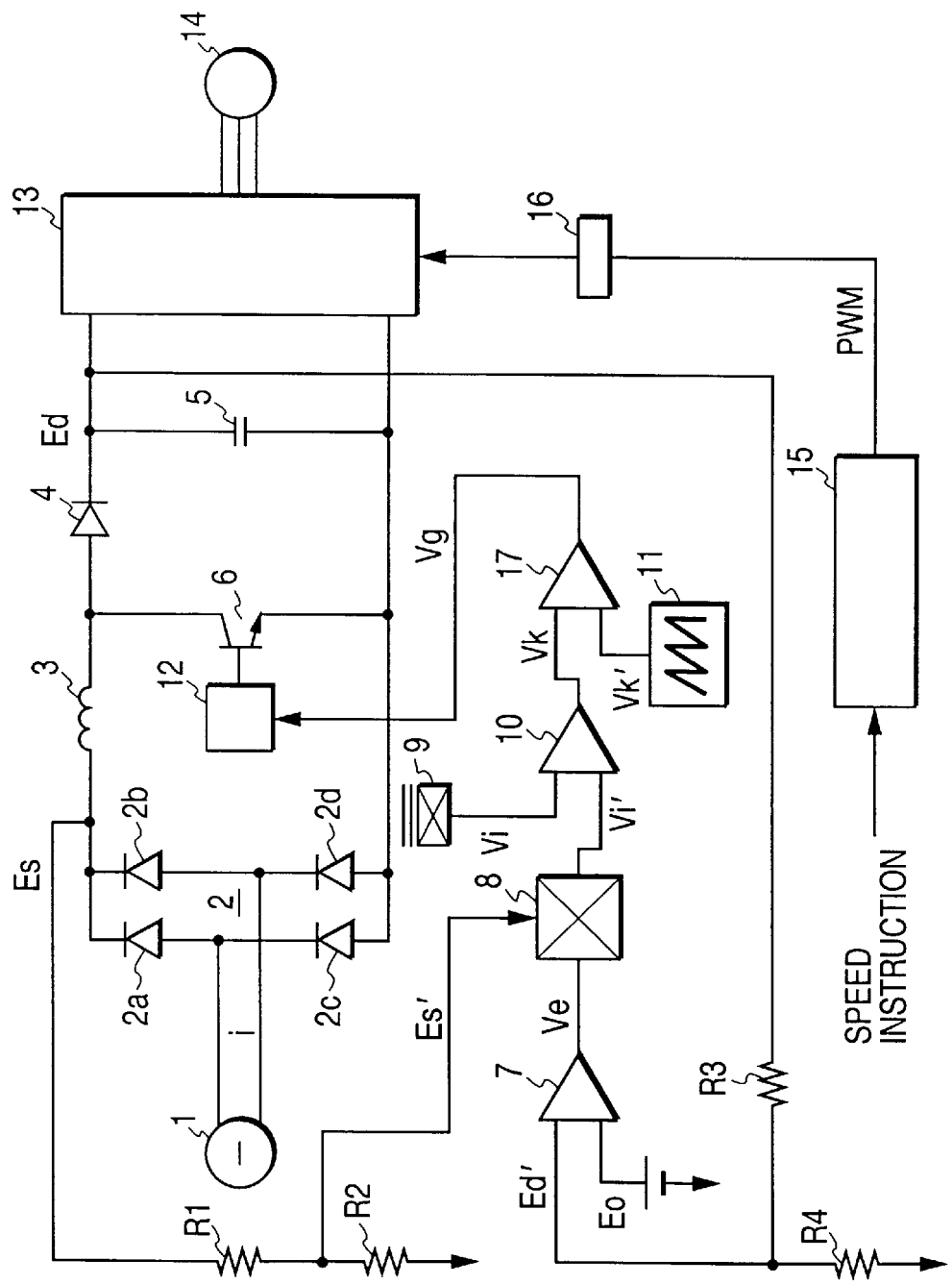

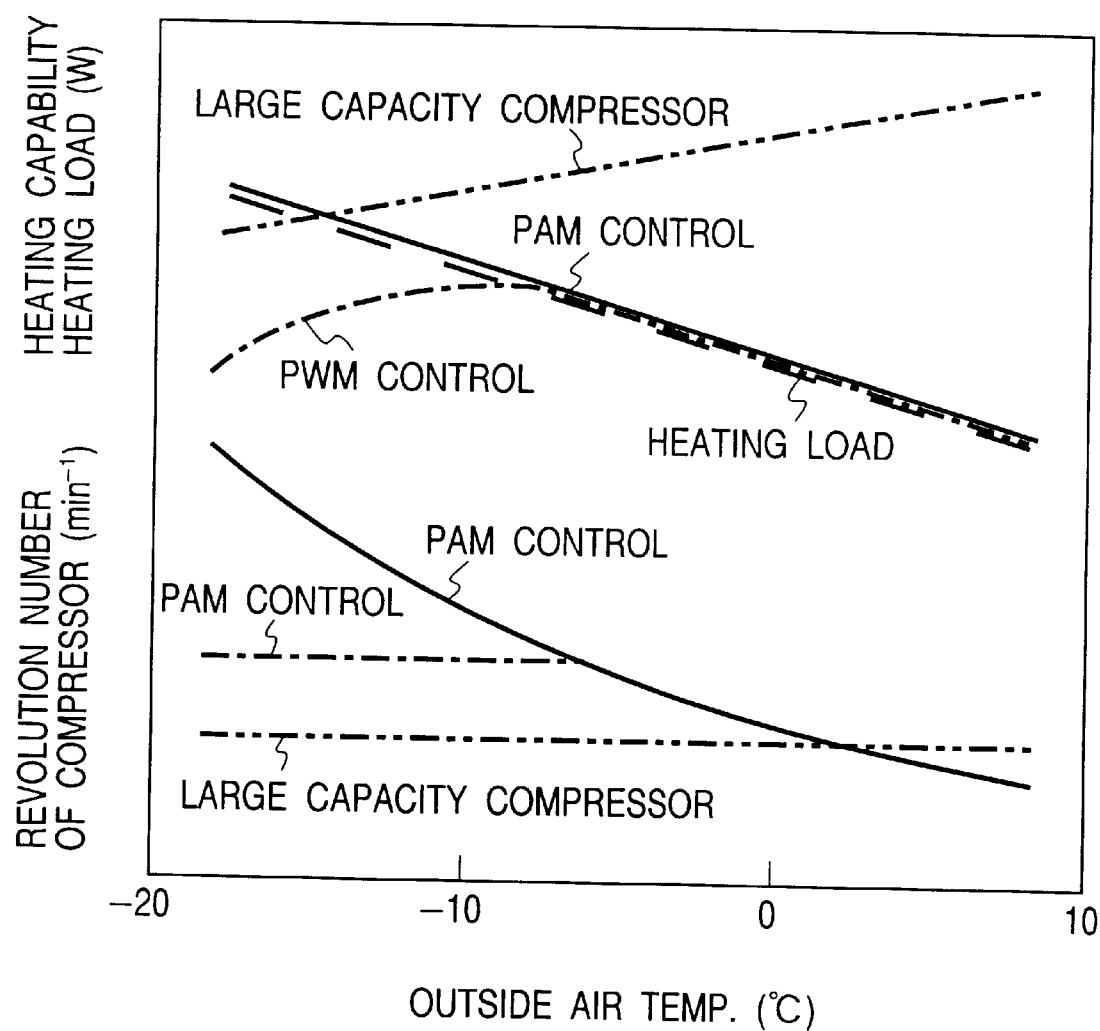

DEHUMIDIFICATION OPERATION

COOLING AND HEATING OPERATIONS

AIR CONDITIONER

BACKGROUND OF THE INVENTION

1. Field of the Invention

The present invention relates to an air conditioner using a compressor driven variably in revolution number by an inverter, in particular, to an air conditioner which is able to shorten a necessary time until a room temperature comes up to a preset temperature after initiating a heating operation, or which is constructed by combining an electric motor and a refrigerating cycle so as to obtain a comfortable heating operation in a cold district, and an electric motor used therefor.

2. Description of Prior Art

In a conventional air conditioner, for reducing an electric power consumption, an improvement in a performance was made especially in a low range of a revolution number of a compressor where there is not necessitated relative large capacity. As an example of such recent technology for improvement of the performance, a technology in which the revolution number of the electric motor for driving a compressor is variably controlled by an inverter of PWM (Pulse Width Modulation) control can be listed. With the PWM control, it is intended to increase an efficiency without increasing a drive torque so much.

And, there is also known an air conditioner which is adopted to a relative low temperature of an outside air or a large drive load of the heating operation by using a compressor of large capacity in refrigerant compression corresponding to a drive load.

In case that the temperature of the outside air is low or that the necessary heating capacity is large, an ejection pressure of the refrigerant increases and a condensation pressure of an interior heat exchanger also comes up to be high. For reducing the condensation pressure, it can be considered that the above condensation pressure is made small by increasing the heat transmitting or exchanging area of the interior heat exchanger so as to make easy to condense the refrigerant gas, thereby reducing the drive torque of the electric motor and increasing the efficiency.

As an example of a conventional art to control the revolution number of the electric motor so as to increase the efficiency, followings are known. As an example of an electric motor driving apparatus of conventional art is shown, for example in Japanese Patent Publication No. Hei 7-89743 (1995), in which as an electric power source is adopted an electric power converter of a high power factor which can suppress high harmonics in an input current. In FIG. 12 showing an block diagram of such the conventional electric motor driving apparatus, a reference numeral 1 depicts a a-c power source, 2 a rectifier, 2a, 2b, 2c and 2d diodes, 3 a reactor, 4 a diode, 5 a condenser, 6 a switching element, 7 a voltage comparator, 8 a multiplier, 9 a load current detector, 10 a current compactor, 11 an oscillator, 12 a driver circuit, 13 an inverter, 14 an electric motor, 15 a micro computer, 16 an inverter driver circuit, and 17 a modulator. In the same dawning, a portion, including the rectifier 2, the reactor 3, the diode 4, the condenser 5, the switching element 6, the voltage comparator 7, the multiplier 8, the load current detector 9, the current comparator 10, the oscillator 11, the driver circuit 12 and the modulator 17, constitutes an electric power converter, and the inverter uses the electric power converter as the power source thereof.

First, an explanation will be given on the electric power converter.

The a-c power voltage from the a-c power source 1 is rectified in full-wave by the rectifier 2 constructed with those diodes 2a through 2d, and converted into a rectified voltage Es. The rectified voltage Es is applied to the condenser 5 through the reactor 3 and the diode 4, thereby a smoothed d-c voltage Ed can be obtained. In parallel to those diode 4 and the condenser 5, the switching element 6 is provided.

The smoothed d-c voltage Ed with the condenser 5 is divided by resistors R3 and R4 so as to form a d-c voltage Ed', and the difference between this and a reference voltage Eo is obtained by the voltage comparator 7 so as to form a voltage controlling signal Ve.

The rectified voltage Es, which is obtained through the full-wave rectification of the a-c power source voltage of the sinusoidal wave-form by the rectifier 2, is also divided by the resistors R1 and R2 so as to form a synchronizing signal Es' of the sinusoidal wave-form, and the sinusoidal synchronizing signal Es' is calculated with the voltage controlling signal Ve from the voltage comparator 7 by the multiplier 8 to form a current reference signal Vi'. The current reference signal Vi' is compared with a current signal Vi obtained by the load current detector 9 in the current comparator 10 so as to obtain a modification signal Vk. The modifier 17, to which the modification signal Vk is supplied, modifies a carrier wave of a saw-tooth or a triangle wave-form from the oscillator 11 to form a switching drive signal Vg of so called a PWM (Pulse Width Modulation) where a duty ratio is changed depending on the modification signal Vk. On the modification signal Vk, the driver circuit 12 drives the switching element 6 into ON or OFF state.

As is mentioned above, in the conventional art, the switching element 6 is driven ON or OFF following the wave-form of the sinusoidal rectifier voltage Es, thereby it is possible to obtain the sinusoidal current of less high harmonic wave components and of high power factor as the input a-c current. And, the commutation rate of the switching element 6 is changed depending on the difference between the reference voltage Eo and the d-c voltage Ed, thereby it is possible to obtain a stable d-c voltage Ed irrespective of a fluctuation of the load. Consequently, it is said, by setting the reference voltage Eo and the resistance value of the resistors R3 and R4 appropriately, it is possible to set the d-c voltage Ed at a desirable voltage value, and to convert an input a-c electric power into a d-c output.

Next, an explanation will be given on an electric motor driver circuit shown in FIG. 12.

The d-c electric power produced with the above electric power converter is inverted into the a-c electric power through the inverter 13, and it is supplied to drive the electric motor 14. And, the inverter 13 is supplied with the PWM signal which is calculated and outputted from the micro computer 15 on the basis of a speed instruction through the inverter driver circuit 16, thereby the inverter 13 is driven so as to drive the switching element (not shown in drawing) into ON or OFF at a predetermined commutation ratio.

Next, as a conventional air conditioner in which the heat exchanging area of the interior heat exchanger is enlarged, such as shown in "GD Series of An Air Conditioner of Low Energy Consumption Type Applying New Dehumidification Method", Toshiba Review, Vol. 51, No. 2, 1996, PP 67–70 (Document 1), recently, an air conditioner having such a construction that the interior heat exchanger is extended form a front surface of an interior machine to a back surface thereof, and an air conditioner in which an interior auxiliary heat exchanger being able to be used as an excess cooler under the heating operation is provided in down flow side of the interior heat exchanger, are developed.

The conventional arts of the mentioned-above has following drawbacks.

1) In case that the operation load is large, especially, when the air conditioner is operated for heating in a area of very cold temperature, such as the outside air temperature is −10° C. or −15° C. in the cold district, and in case that the room temperature is so decreases that the wall and the furniture therein are chilled when it is initiated to operate, in accordance with the revolution number control trying to increase the efficiency without increasing the drive torque so high by the above PWM control, because of shortage of the drive torque, it is impossible to rotate it at a necessary high revolution number, thereby failing to reach the preset temperature or necessitating a long time period to reach it.

2) In case that a compressor having large refrigerant compressing capacity corresponding to the operation load is used, if the outside air temperature is relative high and the load for the heating operation is small, the compressor is turned on and off since the operation capability is in excess. With the operation of turning on and off is increased the electricity consumption and a comfortableness is lost as well, since the room temperature is up and down.

3) In an air conditioner for home use, it is so designed that an upper limit is provided in the input current of the air conditioner in consideration with a capacity of an average capacity of a breaker circuit. From such the reason as well, the drive torque of mentioned-above cannot be increased so much.

4) When the outside air temperature is low, since the heating capability of necessity is large, the ejection pressure of the refrigerant from the compressor increases and the condensation pressure of the interior heat exchanger becomes high. Since work amount becomes large under the high condensation pressure, it results in an increase of the electric power consumption.

5) For reducing the electric power consumption, it is necessary to reduce the condensation pressure mentioned above. For that purpose, it is conceivable to increase the heat exchanging area of the interior heat exchanger, thereby making the condensation of the refrigerant gas easy. However, with the air conditioner, since the sizes of an standard interior machine are already determined in consideration with an installation and an interior wideness of a room, it is difficult to enlarge the area of the interior heat exchanger which directly relates to the sizes of the interior machine.

As is in the above, also in case of the air conditioner in which the interior heat exchanger is enlarged enough in the interior machine, and is further with the auxiliary heat exchanger, it is still needed to improve the heat exchanging efficiency in the interior heat exchanger in each of the cooling and heating operations as far as possible, thereby to maintain the efficiency of a refrigeration cycle at high, by designing piping construction of the interior heat exchanger and the relationship to an air flow thereof.

Explaining in more concretely, with the construction of the electric motor driver apparatus of the conventional art mentioned above, the d-c voltage Ed is obtained with stability irrespective of changing in the input a-c power voltage, however, in case that it is desirable to change the d-c voltage Ed depending on the voltage value of the input a-c power voltage, a circuit constant must be revised. In particular, for obtaining a stable control, since it is the electric power converter of a booster type in the prior art mentioned above, the d-c voltage Ed should be set as follows, with the equation below: d-c voltage Ed≧a-c source voltage×1.41+10 [V] if the input a-c source voltage is equal to 100 V, the d-c voltage Ed is set at equal or higher than 150 V, and if it is 200 V, Ed at equal or higher than 300 V, respectively.

Therefore, for obtaining the electric power converter which can be used in both 100 V and 200 V a-c power source 1, it is necessary to set the set value of the d-c voltage Ed at to be equal or higher than 300 V.

For example, in case of the 100 V input a-c source voltage, with a revolution control without the chopper of the 100% commutation rate and with an arbitrary d-c voltage Ed which is equal or higher than 150 V, a loss can be diminished, rather than through the revolution control with the constant d-c voltage Ed around 300 V and with chopper-driving of the inverter 13 at an arbitrary commutation rate. However, the above prior art never takes such the regard into consideration, therefore it has drawback that the loss becomes much more that that of necessary.

Further, with the above prior art, since it adopts a method, in which the input a-c current is controlled in the sinusoidal wave-form by referring the current reference signal Vi' which is produced by calculating in the multiplier 8 the voltage control signal Ve and the sinusoidal synchronization signal Es' which is formed by dividing the sinusoidal rectified voltage Es obtained by the full-wave rectification of the a-c source voltage from the a-c voltage source 1, if the a-c source voltage supplies 100 V and 200 V, the shape of the obtainable sinusoidal wave-forms differ in respective cases due to the difference in the rectified voltage Es. Because of this respect, if being used in common with the 100 V a-c source voltage and the 200 100 V a-c source voltage, it comes to be the electric power converter having a bad power factor and a high content rate of the high harmonics.

Moreover, with an electric motor driver apparatus or an air conditioner using such the electric power converter as mentioned in the above, if it is used with 100 V or 200 V of the a-c source voltage, the electric power converter must designed satisfying the specifications corresponding to them respectively. Therefore, it causes an increase in production types or variations, and a decrease in an efficiency of production or productivity thereof.

Furthermore, in case that the input a-c current is small, and, in particular that there is no need of such the control as mentioned above, on the contrary, there is not taken any consideration of removing or prohibiting from an unstable operation in control or loss, or noises when the input current is a low amount.

For example, when a resistor is used as the load current detector 9 to obtain the current signal Vi from a voltage appearing across the both ends of it, it is necessary to generate the voltage enough for the control even for a very small amount of current, and in concrete, it is necessary to set the resistance value of the resistor at a large value. In that case, however, an electric power consumed with the resistor becomes great and causes the increase in the loss, in particular when the load current comes to be a large amount.

Furthermore, with the inverter 13 in which the d-c source voltage Ed is constant, the electric motor 14 is rotated at a predetermined revolution number corresponding to the duty ratio which is determined by chopping the d-c source voltage Ed with the commutation ratio depending on the duty ratio of the PWM signal from the micro computer 15. Namely, in such the conventional electric motor driver apparatus in which the revolution number of the electric motor 14 changes depending on the change in the duty ratio, as mentioned above, the inverter 13 is always driven with the chopper operation, thereby causing the electric power loss (a chopper loss) and necessarily lowering the efficiency thereof.

SUMMARY OF THE INVENTION

An object of the present invention is to dissolve the such problems, and to provide an air conditioner which can be commonly used with plural kinds of differing electric power sources, for example 100 V and 200 V, and which also can obtain a good power factor for each of the power sources with lowering the containing ratio of the high harmonics.

An another object of the present invention is to provide an air conditioner which is so constructed that it is able to remove or prohibit from an unstable operation in the control or the loss, or the noises when the input current is a low amount.

An further another object of the present invention is to provide an air conditioner which is so constructed that it is able to reduce the electric power loss, thereby increasing the efficiency thereof.

An further another object of the present invention is to provide an air conditioner by which an efficiency can be increased by reducing the electric power loss in the inverter and the condensation pressure in the interior heat exchanger as well, and to provide an air conditioner which is equipped with an electric motor driver apparatus of reducing the electric power loss in the inverter.

For accomplishing the above object, in accordance with the present invention, there is provided an electric motor driver apparatus and an air conditioner, in which, for example the a-c voltage from the a-c electric power source is detected and simultaneously decided to be, for example, 100 V or 200 V, and are provided means for changing the detected value of the d-c voltage or the voltage reference value depending on a result of the judgment, means for changing the value of a sinusoidal synchronization signal obtained by dividing the rectified voltage of a sinusoidal waveform which is obtained by full-rectification of the a-c source voltage from said a-c electric power source, thereby being able to corresponding to the different voltages, i.e., 100 V and 200 V.

For accomplishing the above further object, in accordance with the present invention, the inverter is driven as a chopper in a region within a predetermined revolution number of the electric motor, and when it is driven at the revolution number higher than the predetermined revolution number, it is turned into a power source drive in which the d-c power source voltage of said inverter is changed. With this power source drive, an electric power loss is mostly dissolved, thereby increasing efficiency.

For accomplishing the above further object, in accordance with the present invention, it can be considered that the revolution number of the electric motor for driving the compressor is performed by PAM (Pulse Amplitude Modulation) control as well as by positioning the interior auxiliary heat exchanger in the down flow side of the above-mentioned interior heat exchanger.

Namely, the above objects are achieved by an air conditioner comprising:

a compressor for compressing refrigerant;

an interior heat exchanger into which the refrigerant is flown from said compressor;

an auxiliary interior heat exchanger which is positioned at down flow side of said interior heat exchanger in the refrigerant flow under heating operation;

an electric motor for driving said compressor; and an electric motor driving apparatus for supplying an a-c voltage to said electric motor to drive; wherein, driving the electric motor with the output voltage obtained by chopper controlling the commutation current of a second switch element of an inverter, if the revolution number of said electric motor is less than a predetermined revolution number; and driving the electric motor with the output voltage which is obtained by controlling the conduction rate of on and off of a first switch element of an electric power converter corresponding to the revolution number of the electric motor and with the conduction rate of 100% of a commutation cycle of a switch element of the inverter, if the revolution number of said electric motor exceeds the predetermined revolution number.

BRIEF DESCRIPTION OF DRAWAING(S)

FIG. 12 is a drawing which shows the circuit construction of an electric motor driver apparatus in the conventional air conditioner;

FIG. 13 is a drawing which shows a heating characteristics with respect to an outside air temperature;

Figure 1:
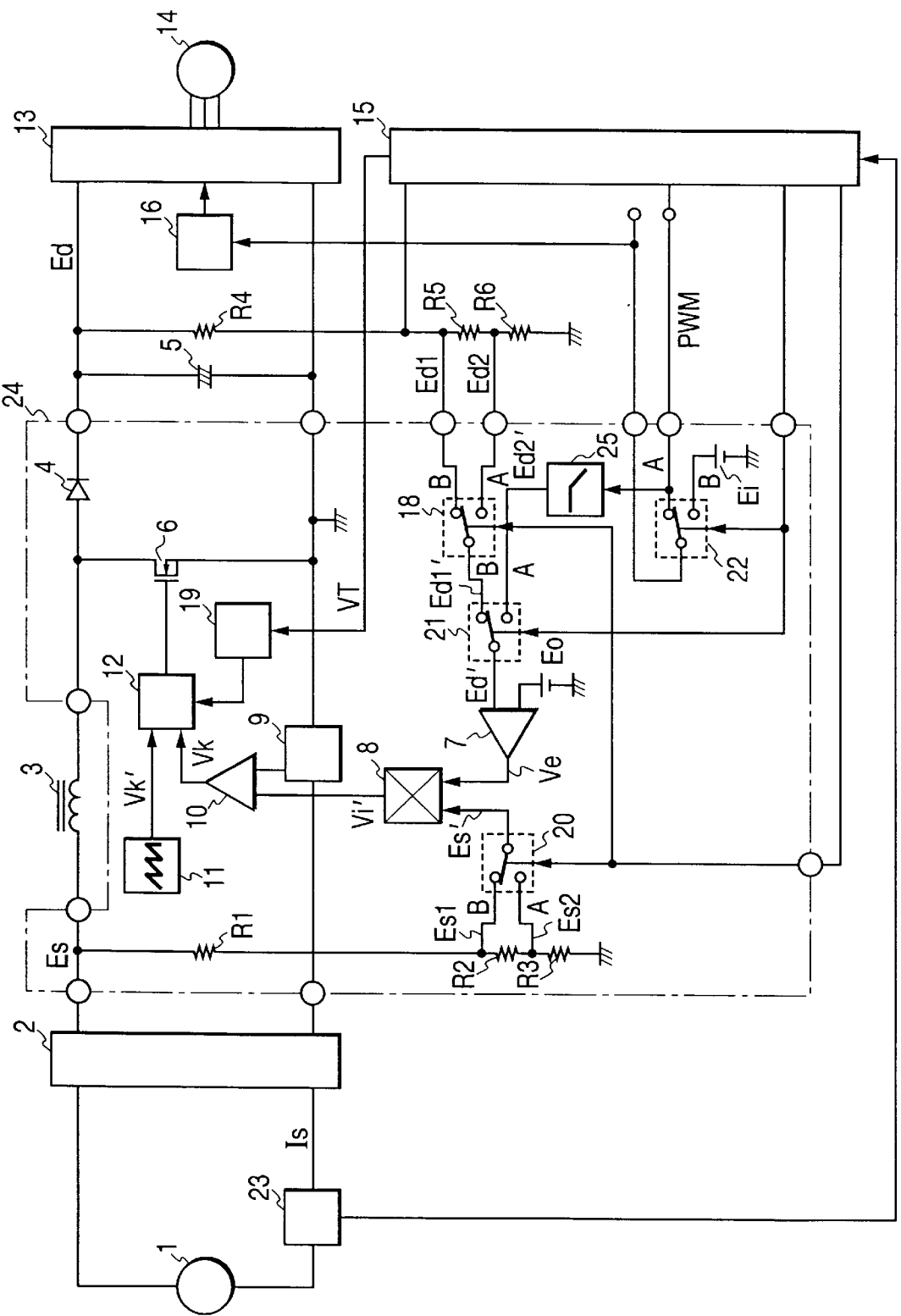
FIG. 1 is a block diagram showing a first embodiment of an air conditioner in accordance with the present invention.
Figure 14A:
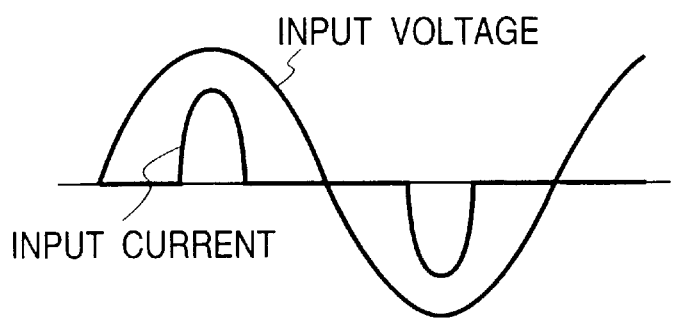
Figure 14B:
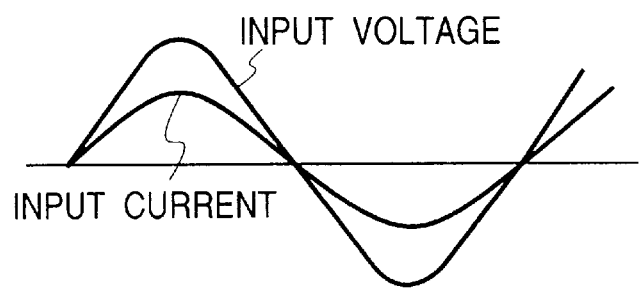
Figure 14C:
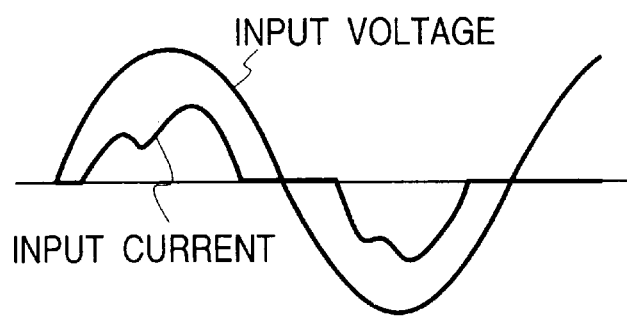
Figure 15A:
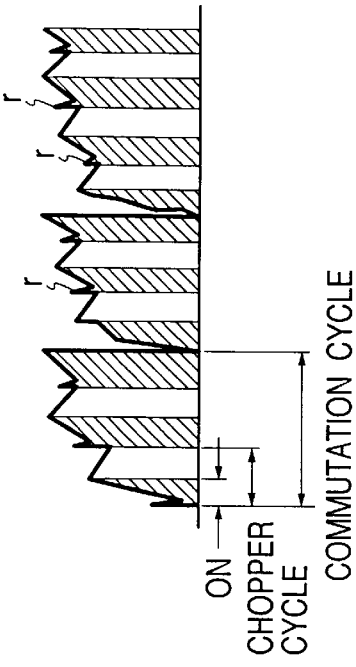
Figure 15D:
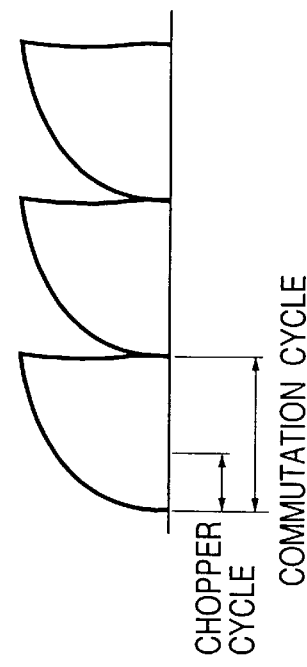
Figure 15B:
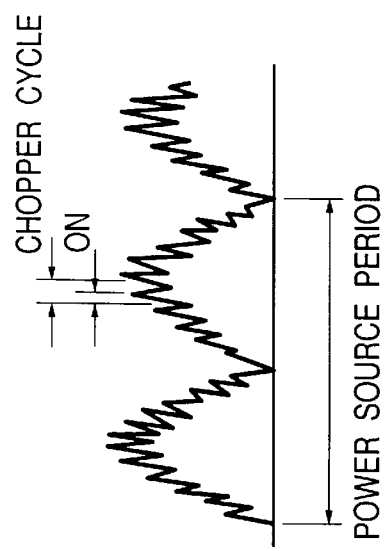
Figure 15C:
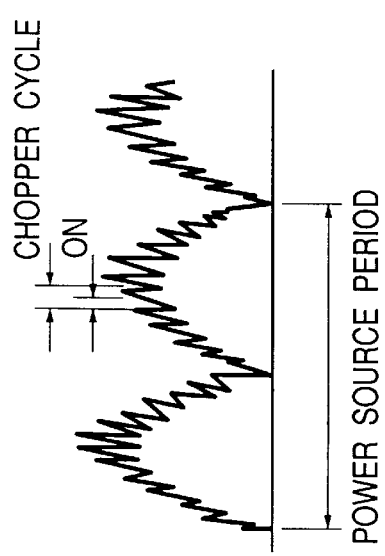
Figure 16B:
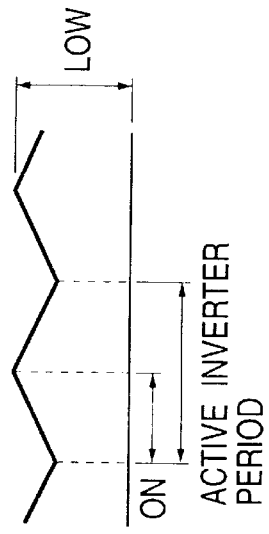
Figure 16D:
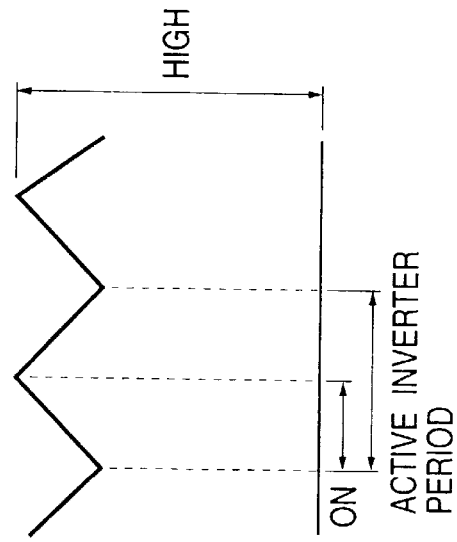
Figure 16A:
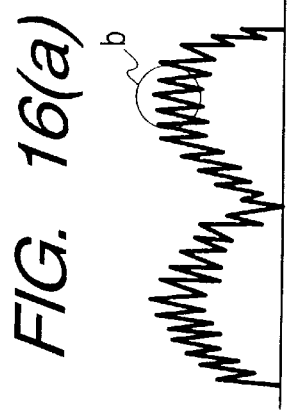
Figure 16C:
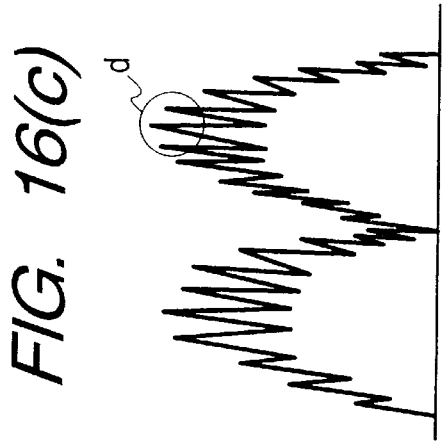
Figure 17B:
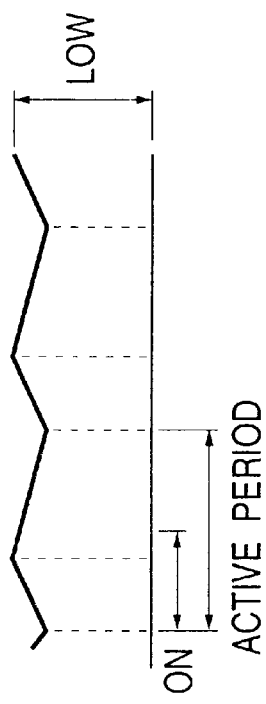
Figure 17D:
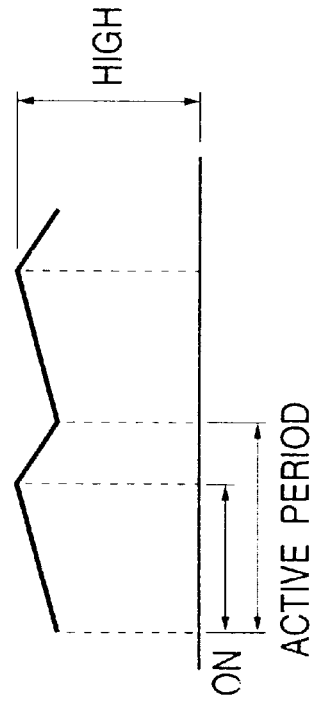
Figure 17A:
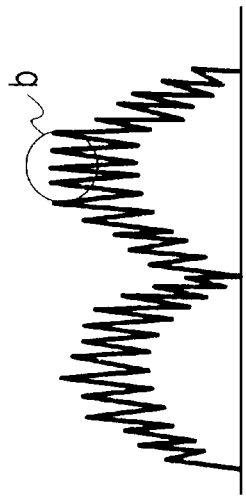
Figure 17C:
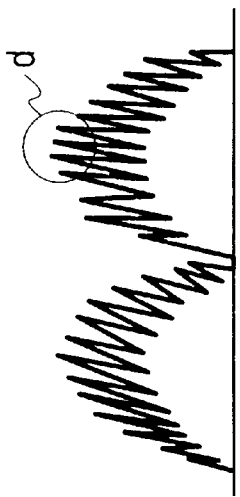
Figure 18:
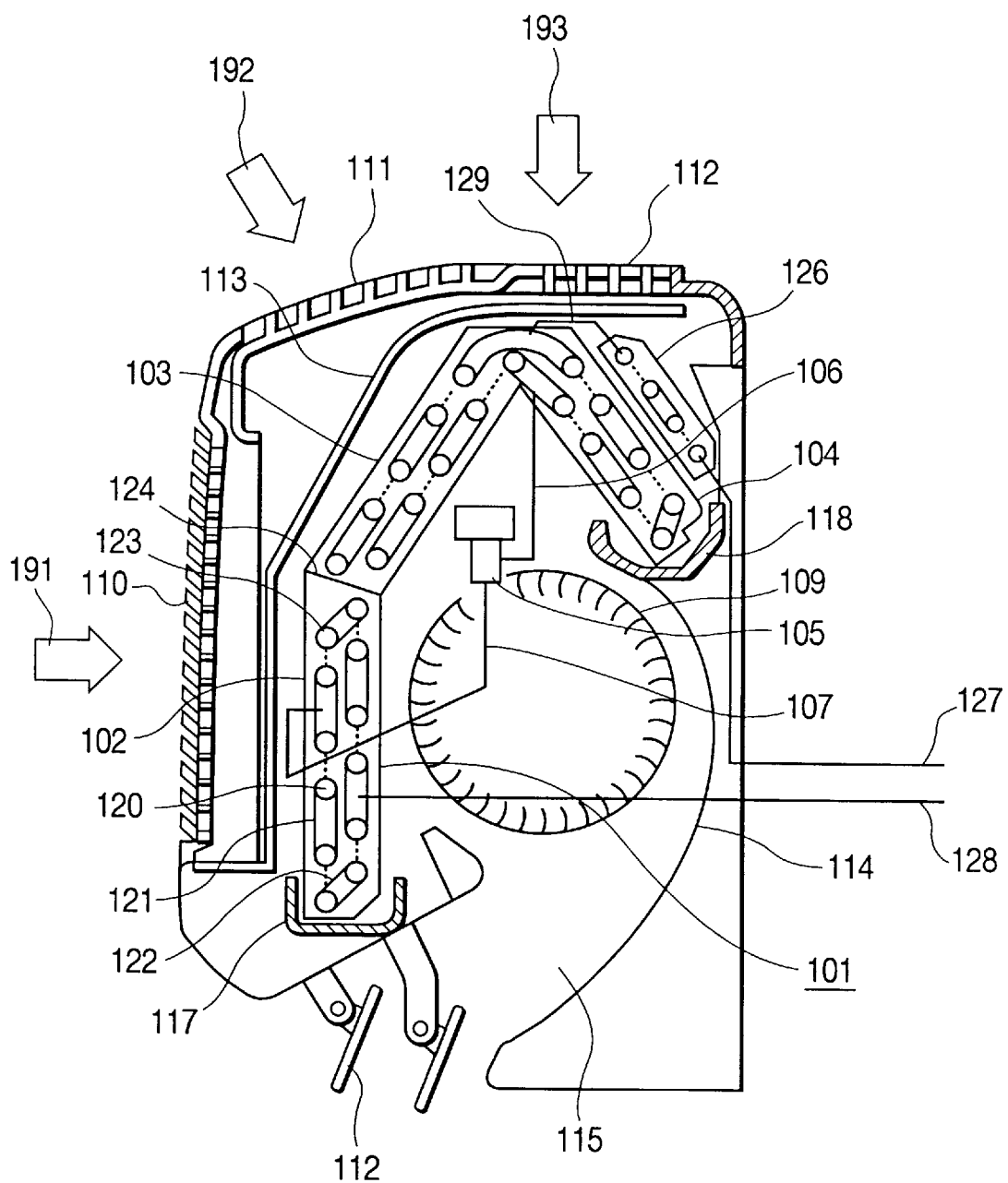
Figure 19A:
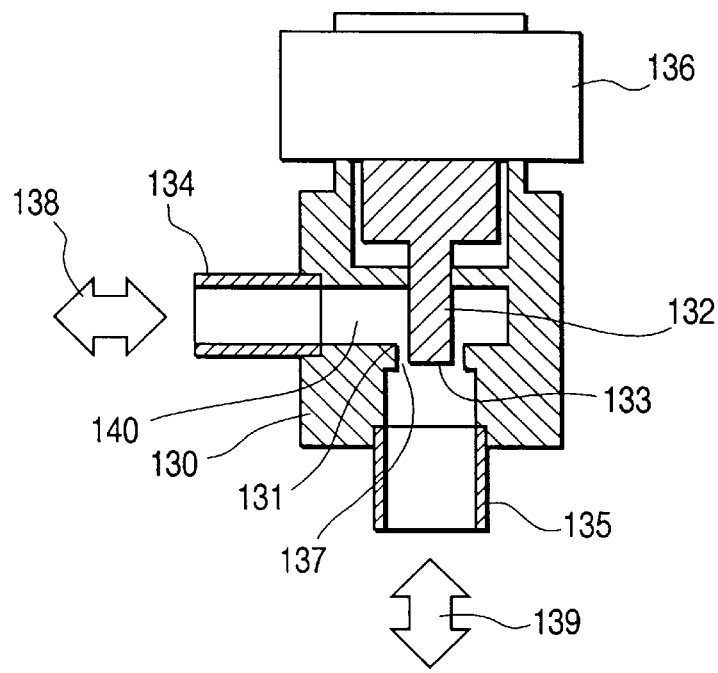
Figure 19B:
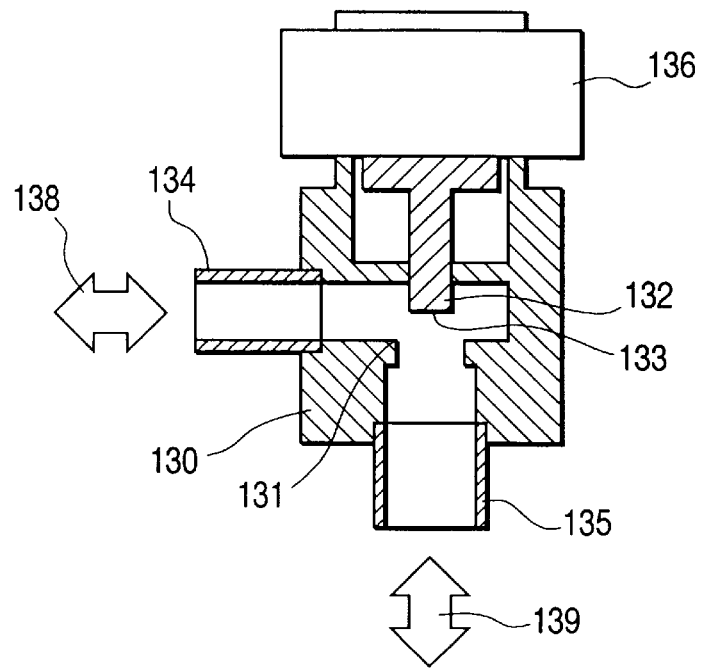
Figure 20:
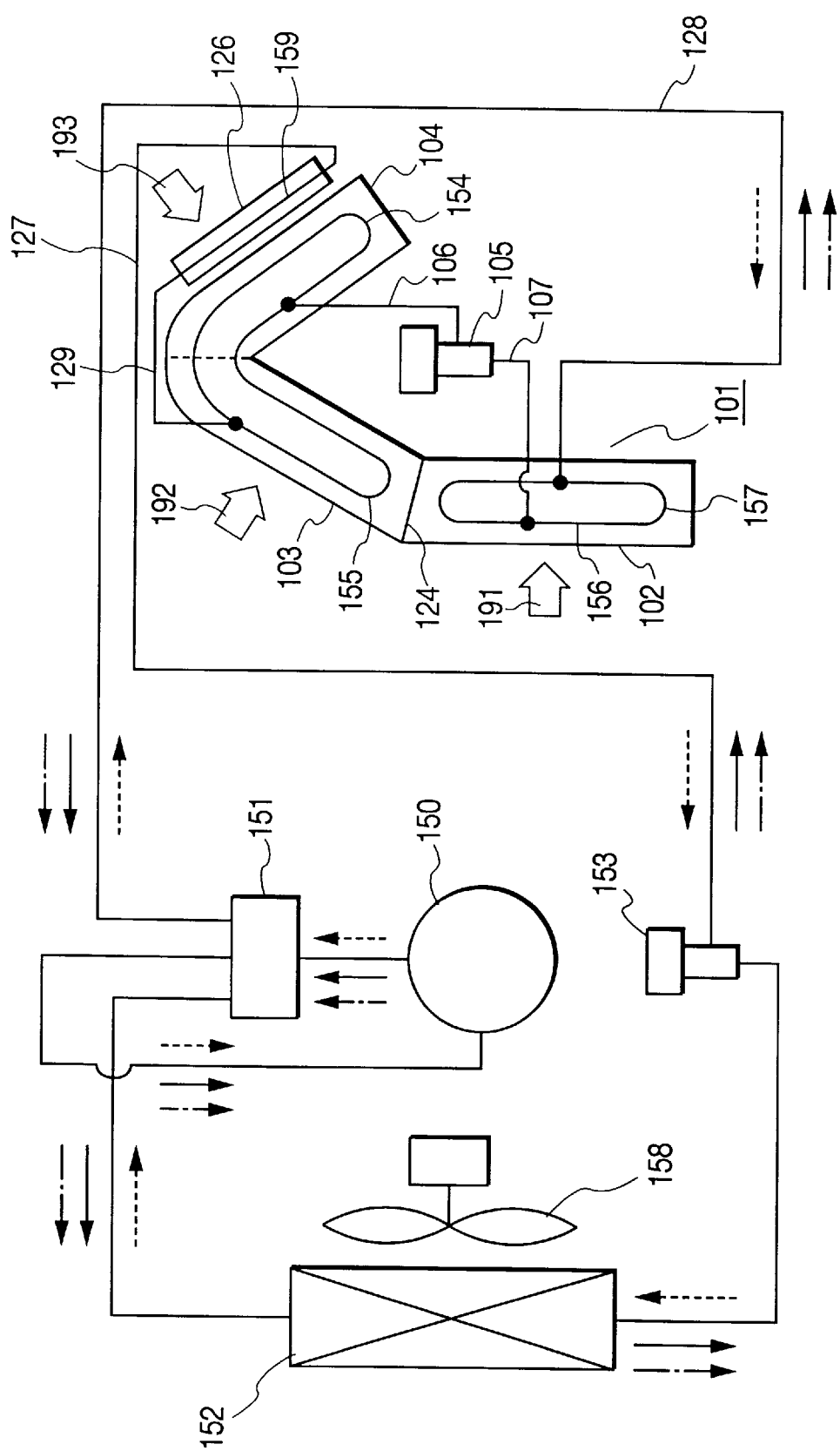
Figure 21:
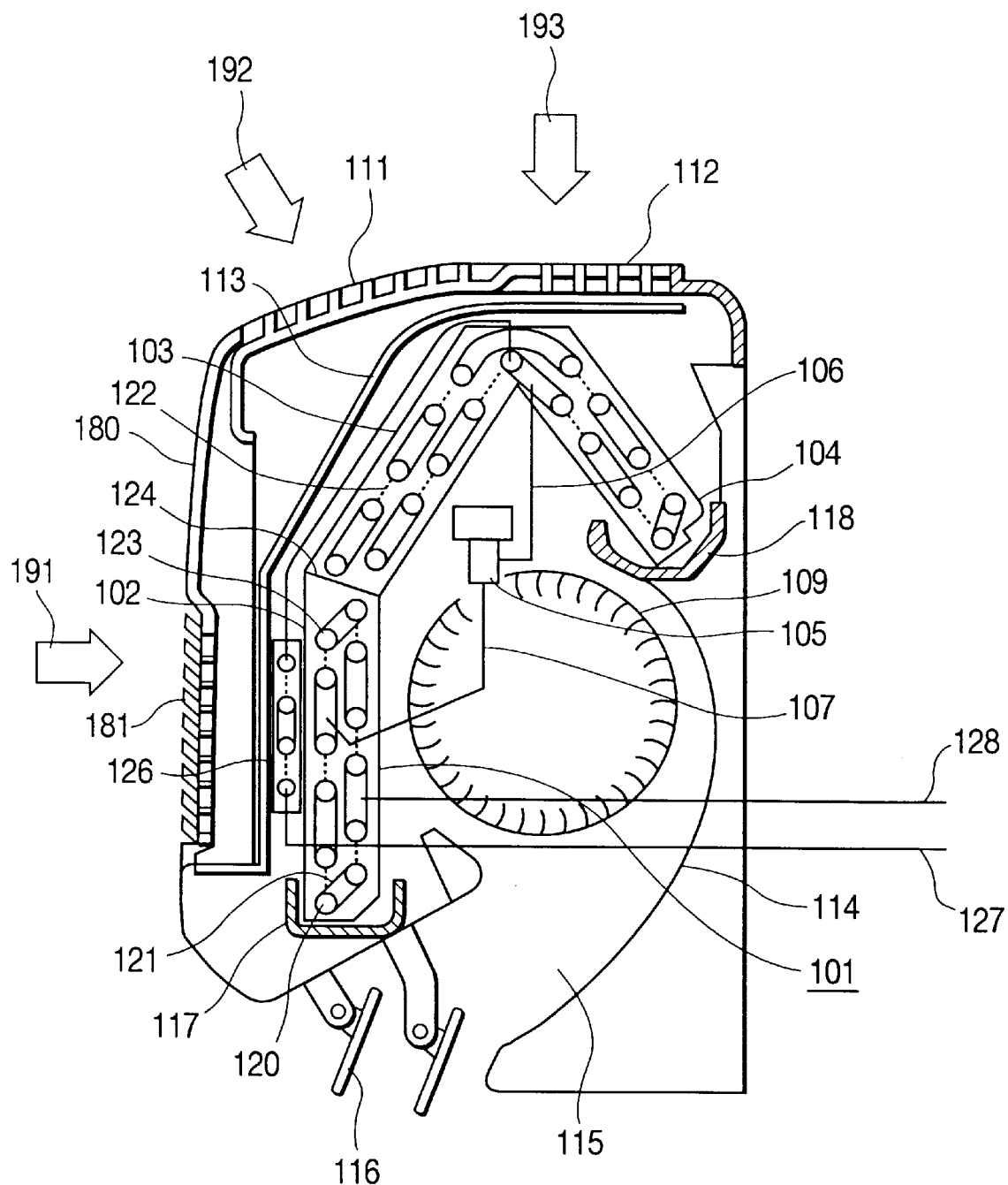

FIGS. 14(a)–14(c) are drawings which show a wave-form of an a-c electric power source input just after operation as an active converter with the embodiment in accordance with the present invention;

FIGS. 15(a)–15(d) are drawings which show a current of a reactor 3 and an inverter current before and after exchanging between PWM/PAM;

FIGS. 16(a)–16(d) are drawings which show a wave-form of the reactor current responding to load actuation;

FIGS. 17(a)–17(d) are drawings which show a wave-form of the reactor current with respect to d-c current;

FIG. 18 is a drawing which shows construction of an interior machine of the air conditioner of an embodiment in accordance with the present invention;

FIGS. 19(a)–19(b) are drawings which show construction and operation of an example of a valve for dehumidification in FIG. 1;

FIG. 20 is a drawing which shows a cycle construction of the air conditioner of the embodiment in accordance with the present invention; and FIG. 21 is a drawing which shows an interior construction of the air conditioner of the embodiment in accordance with the present invention.

DETAILED DESCRIPTION OF PREFERRED EMBODIMENTS

Hereinafter, embodiments according to the present invention will be fully explained by referring to the attached drawings.

In FIG. 1 showing a block diagram of a first embodiment of the air conditioner according to the present invention, a reference numeral 18 denotes a d-c current exchange switch, 19 a trigger element, 20 a synchronization signal exchange switch, 21 a voltage instruction exchange switch, 22 a drive signal exchange switch, 23 an input current detector, 24 an active converter block, and 25 LPF (Low Pass Filter), wherein the same reference numerals are attached to the corresponding elements shown in FIG. 12 for eliminating the redundancy of the explanation.

In FIG. 1, the d-c voltage Ed smoothed with the condenser 5 is divided by the divider circuit of the resistors R4, R5 and R6, and d-c voltages Ed1 and Ed2 are formed. Where, it is $$Ed1 = Ed \times (R5+R6)/(R4+R5+R6)$$

$$Ed2 = Ed \times R6/(R4+R5+R6)$$

and Ed1>Ed2.

The d-c voltage Ed1 is supplied to a contact point B of the d-c voltage exchange switch 18, and the d-c voltage Ed2 is supplied to a contact point A of the d-c voltage exchange switch, respectively. The d-c voltage exchange switch 18 is controlled in the exchanging operation by the micro computer 15 depending on the divided voltage Ed1 of the d-c voltage Ed, and a selected one of the d-c voltages Ed1 and Ed2 is output as the d-c voltage Ed1' from the d-c voltage exchange switch 18.

The output d-c voltage Ed1' of the d-c voltage exchange switch 18 is supplied to a contact point B of the voltage instruction exchange switch 21. And, to the contact point of the voltage instruction exchange switch 21 is supplied the d-c voltage Ed2', which is formed through the LPF 25 by smoothing the PWM signal and is outputted from the micro computer 15 for the speed control of the electric motor 14. The voltage instruction exchange switch 21 is also controlled in the exchanging operation by the micro computer 15, and the contact point B is selected if the electric motor load is less than the commutation ratio of 100%, and the contact point A is selected if the electric motor load is greater than the commutation ratio of 100%, respectively.

Either one of the d-c voltage Ed1' and Ed2', which is selected by the voltage instruction switch 21, is supplied to the voltage comparator 7, and the difference to the reference voltage Eo is obtained so as to form the voltage control signal Ve.

In the conventional art shown in FIG. 12, though the voltage control signal Ve is obtained by comparing a kind of the d-c voltage Ed' which is obtained by dividing the d-c voltage Ed smoothed by the condenser 5 to the reference voltage Eo, it is obtained by selecting one among the two kinds of the d-c voltages Ed1 and Ed2 and the d-c voltage Ed2' obtained from the LPF 25 and comparing it to the reference voltage Eo, in accordance with the first embodiment.

On a while, a rectified voltage Es which is outputted from a rectifier 2 and of a full wave-form rectification of the sinusoidal wave is divided by a voltage divider of resistors R1, R2 and R3, so as to for voltages Es1 and Es2. Where, it is $$Es1 = Es \times (R2+R3)/(R1+R2+R3)$$

$$Es2 = Es \times R3/(R1+R2+R3)$$

and Es1>Es2.

The voltage Es1 is supplied to a contact point B of the synchronization signal exchange switch 20, and the voltage Es2 is supplied to a contact point A of the synchronization signal exchange switch 20, respectively. The synchronization signal exchange switch 20 is also controlled in the exchanging operation by the micro computer 15, in the same way as the d-c voltage exchange switch 18, depending on the divided voltage Ed1 of the smoothed d-c voltage Ed by the condenser 5, and either the voltage Es1 or Es2 outputted from the synchronization signal exchange switch 20 is supplied to a multiplier 8 as a sinusoidal synchronization signal Es'.

From the multiplier 8 is obtained a current reference signal Vi', and the on-off control of a switch element 6 is conducted by using it, in the same way of the conventional art shown in FIG. 12.

As explained in the above, with the first embodiment, the switch element 6 is made on or off following the wave-form of the rectified voltage Es of the full wave-form rectification of sinusoidal wave, thereby making the input a-c current a sinusoidal wave-form with high power factor and less high harmonics, and as the commutation rate of the switch element 8 is changed depending on the difference value between the reference voltage Eo and the d-c voltage Ed', it is possible to obtain a stable d-c voltage Ed irrespective of the change in the load. Therefore, it is possible to provide the d-c voltage Ed at a desired voltage value, by setting the reference voltage Eo and the resistance values of the resistors R4, R5 and R6 appropiately.

Here, the micro computer 15 also detects a input a-c current Is through the input current detector 23, and supplies the trigger element 19 with a trigger signal VT of a "L" (a low level) during a period until when the current value of the input a-c current Is becomes greater than a preset value. The trigger element 19 controls a driver circuit 12 during the period "L" of the trigger signal VT, and turns the switching element 6 into off state. The trigger signal VT is changed from "L" to "H" (a high level), then the triggering element 19 turns the switching element 6 into an operating condition at this time point.

Further, the PWM signal outputted from the micro computer 15 is supplied to an inverter driver circuit 16 through the drive signal exchange switch 22 which is ordinary closed to a A side setting, and the inverter driver circuit 16 controls on and off of the switching element, not shown in drawing, of the inverter 13, in accordance with the commutation ratio depending on the duty ratio of the PWM signal. Thereby, with the inverter 13, the d-c electric power of the d-c voltage Ed which is supplied from the condenser 5 is chopped with this commutation ratio and inverted into an a-c electric power, and it is supplied to the electric motor 14 so as to rotate it at a revolution number corresponding to the duty ratio of the PWM signal.

Next, as an example being used in Japan, a control operating method of the first embodiment will be explained by referring to FIG. 2. In Japan, there are two kinds of a-c power source voltages, i.e., 100 V and 200 V.

First, when the power source is turned on (a step 100), the micro computer 15 is initialized, thereby the micro computer 15 turns the contact points of the d-c voltage exchange switch 18 and the synchronization exchange switch 20 to the side A, the contact point of the voltage instruction exchange switch 21 to the side B, and the contact point of the drive signal exchange switch 22 to the side A, respectively. Thereby, the d-c voltage exchange switch 18 selects the d-c voltage Ed2, and the following d-c voltage Ed' is applied to a voltage comparator 7:

$$Ed'=Ed \times R6/(R4+R5+R6)$$

And, with the synchronization exchange switch 20 is selected the sinusoidal synchronization signal Es2.

The condenser 5 starts a charging operation under such the condition, the micro computer 5 detects the divided voltage Ed1 of the d-c voltage of the condenser 5 (a step 101). From the voltage value of the detected d-c voltage Ed1, the d-c voltage Ed is obtained by the following equation:

$$Ed=Ed1 \times (R4+R5+R6)/(R5+R6)$$

Then, if the d-c voltage Ed is higher than, for example 160 V (a step 102), it is decided that the input a-c power source voltage is 200 V, and the d-c voltage exchange switch 18 is kept to be closed to the contact point A (a step 103). Thereby, the d-c voltage Ed' is comes to be the d-c voltage Ed2, then the d-c voltage Ed obtained with the condenser 5 is as follows:

$$Ed=Ed2 \times \{1+(R5+R4)/R6\}$$

And, the synchronization signal exchange switch 20 is also kept to be closed to the contact point A (a step 104). Therefore, the sinusoidal synchronization signal Es' is as follows:

$$Es'=Es \times R3/(R1+R2+R3)$$

On a while, if the d-c voltage Ed is lower than 120 V for example (a step 102), the input a-c power source voltage is decided to be 100 V, and the d-c voltage exchange switch 18 is exchanged to the contact point B (a step 110). Therefore, the d-c voltage Ed of the condenser 5 is as follows:

$$Ed=Ed1 \times \{1+R4/(R5+R6)\}$$

Further, the synchronization signal exchange switch 20 is exchanged to the contact point B (a step 111). Therefore, the sinusoidal synchronization signal Es' is as follows:

$$Es'=Es \times (R2+R3)/(R1+R2+R3)$$

In this way, by controlling the exchange in the d-c voltage exchange switch 18 and the synchronization signal exchange switch 20 depending on the value of the input a-c power source voltage, when the input a-c source voltage is 200 V, the d-c voltage Ed', and the sinusoidal synchronization signal Es' are made to the d-c voltage Ed2 and Es2 of lower values, respectively, and when the input a-c source voltage is 100 V, the d-c voltage Ed' and the sinusoidal synchronization signal Es' are changed to the d-c voltage Ed1 and Es1 of higher values, respectively. Thereby, it is possible to suppress the difference of the d-c voltage Ed' between when the input a-c source voltage is 100 V and when it is 200 V, and to prevent from an instability in the control caused by a saturation due to excessively increasing in the amplitude of the voltage control signal Ve, and from a drawback that the current reference signal Vi' which is calculated from the sinusoidal synchronization signal Es' and the voltage control signal Ve is disturbed to be a current waveform of non-sinusoidal wave.

Only two kinds of input a-c source voltages of 100 V and 200 V are disclosed in the above embodiment, however, generally, assuming n kinds of input a-c source voltages, V1, V2, . . . Vn, and n kinds for each d-c voltages Ed' and Es' in the same manner, the same effect can be obtained by deciding to which one of the V1, V2, . . . Vn the input a-c source voltage is close, and by selecting the d-c voltages Ed' and Es' corresponding to the input a-c source voltage on the basis of the decision thereof.

In case that the input a-c source voltage is decided to be 200 V in the step 102, also the voltage instruction exchange switch 21 is maintained to be in the condition of being closed to the contact point of B side (a step 105). At this time, it is nearly EO=Ed', therefore, the d-c voltage Ed is as follows:

$$Ed=EO \times \{1+(R5+R4)/R6\}$$

In this case, for example it is Ed=300 V.

Further, in this case, the drive signal exchange switch 22 is maintained in the condition of being closed to the contact point of A side (a step 105), the PWM signal outputted from the micro computer 15 is supplied to the inverter drive circuit 16 through the drive signal exchange switch 22.

By the operation mentioned above, the d-c electric power Ed provided by the power converter is inverted by the inverter 13, thereby the electric motor 14 is driven (a step 106). The micro computer 15 produces and outputs the above PWM signal by calculation on the basis of the speed instruction, in the same manner as in the conventional art shown in FIG. 10, thereby the inverter 13 is driven through the inverter drive circuit 16, and the control in the revolution number of the electric motor 14 is achieved by turning the switching elements of the inverter 13 on and off at the preset commutation rate depending on the duty ratio of the PWM signal.

However, in general, in case that the a-c source voltage is Vj (j=1, 2, . . . n) which is one of the above V1, V2, . . . Vn, by comparing the d-c voltage Ed' corresponding to the input a-c source voltage Vj to the constant reference voltage Eo and setting the d-c voltage Ed which is obtained by rectifying and smoothing the input a-c source voltage Vj at an arbitrary constant value (for example, 300 V), the switching elements of the inverter 13 are turned on and off at an arbitrary commutation rate.

In a booster circuit, if the d-c voltage Ed is decreased less than the full-wave rectification voltage Es of the input a-c source voltage, a decrease in the power factor and a turbulence in the current wave-form occur. For preventing from such the drawbacks, when it is decided to be 200 V, the control is carried out with setting at a constant Ed=300 V. Of course, a condition is that it is fully able to obtain the desired revolution number of the electric motor 14 even under Ed=300 V, if it is increased greater than 300 V, the gist of the present invention will not be lost.

The micro computer 15 detects the input a-c current Is through the input current detector 23 (a step 107), and outputs the trigger signal VT of "H" to the trigger element 19 during the period when the input a-c current Is is large so as to operate the switching element 6 on and off during this period (a step 108), thereby continuing the operation (a step 109)

Further, even in case that the input a-c source voltage is decided to be 100 V in the step 102, the voltage instruction exchange switch 21 is maintained in the condition of being closed to the contact point of the side B (a step 112). Therefore, in the same manner as the above, it is approximately E0=Ed', and the d-c voltage Ed is as follows:

$$Ed=E0\times\{1+R4/(R5+R6)\}$$

In this case, for example, Ed=150 V. In this manner, with using the reference voltage E0 in common, the d-c voltage Ed at the condenser 5 can be set at another voltage value other than that when the input a-c source voltage is 200 V.

In this time, if the commutation rate of the inverter 13 is less than 100% (a step 116), the electric motor 14 is driven (steps 112 and 113) in the same manner as the steps 105 and 106, and the switching element 6 is operated on and off (steps 114 and 115) in the same manner as the steps 107 and 108, thereby continuing the operation as it is (a step 118).

However,, under the operation condition of the input a-c source voltage 100 V, for instance, if the load of the electric motor becomes large, and in particular if the commutation rate of the switching element at the inverter 13 comes to be 100% (a step 116), the voltage instruction exchange switch 21 is exchanged to the contact point of side A and the drive signal exchange switch 22 is exchanged to the contact point of side B, respectively (a step 117).

Thereby, the d-c voltage Ed2' which is obtained by smoothly processing the switch element drive signal (the PWM signal) through the LPF 25, which signal is calculated on the basis of the speed instruction and is outputted by the micro computer 15, is outputted from the voltage instruction exchange switch 21 as the d-c voltage Ed', and the voltage control signal Ve which is produced from the d-c voltage Ed' is supplied to the voltage comparator 7. Responding to this, the switch element 6 is controlled on and off so as to provide the d-c voltage Ed at the condenser 5 at an arbitrary voltage being equal to or higher than 150 V. Further, at the same time, since the drive signal exchange switch 22 is changed to the contact point of B side, a voltage Ei for driving the inverter 13 at 100% of the commutation ratio is supplied to the inverter drive circuit 16 through the drive signal exchange switch 22.

Figure 3:
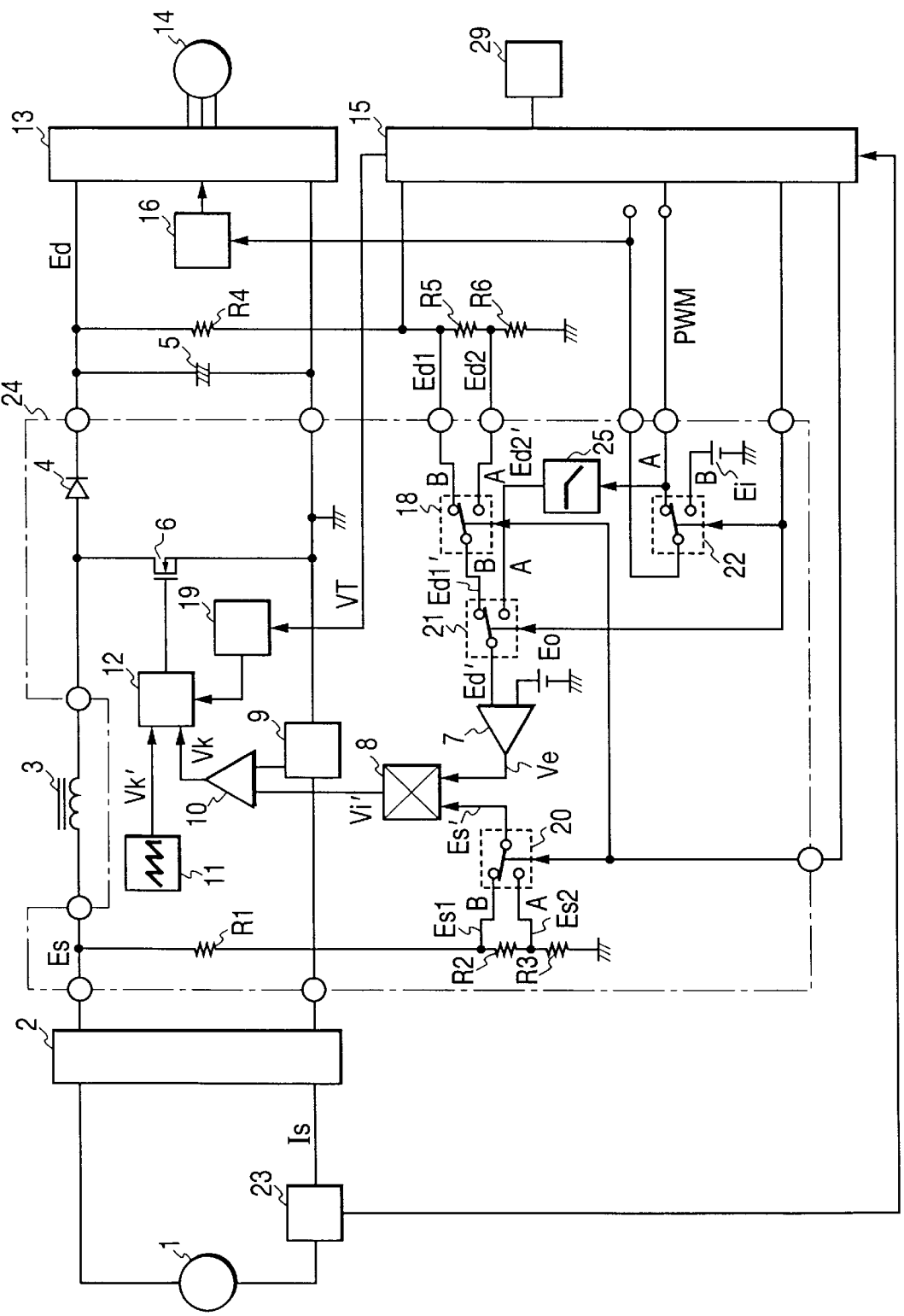
FIG. 3 is a drawing for explanation of the control method shown in FIG. 2 in case that an input a-c source voltage of the first embodiment shown in FIG. 1 is 100 V.

Hereinafter, the above operation of the such the present embodiment in which the input a-c source voltage is 100 V will be given in more detail by referring to FIG. 3, when it is applied for a heating operation of an air conditioner. However, FIG. 3 is the same to FIG. 1 except for additionally provided with a room temperature sensor 29.

In the same drawing, the air conditioner is provided with the room temperature sensor 29, and the micro computer 15 detects the air temperature within the room through the room temperature sensor 29 (the detected temperature is called as "measured room temperature", hereinafter). This is compared with a desired temperature (a set room temperature) which is set by a user, and if the measured room temperature is low and not enough to reach the set room temperature, the duty ratio of the PWM signal is increased depending on the difference thereof, so as to increase the revolution number of the electric motor 14 by increasing the commutation ratio of the switch element in the inverter 13.

In this time, the d-c voltage Ed of the condenser 5, i.e., the d-c electric source voltage of the inverter 13 is fixed at 150 V and the switch element of the inverter 13 is conducting the chopper operation. However, if the measured room temperature does not reach to the set room temperature even when the duty ratio of the above PWM signal comes 100%, the micro computer 15, as explained in the above step 117, changes the drive signal exchange switch 22 to the contact point of B side, so as to supply the constant voltage Ei to the inverter drive circuit 16. Thereby, while maintaining the commutation ratio of the switch elements of the inverter 13 at 100%, the voltage instruction exchange switch 21 is changed to the contact point of side A so as to supply the voltage Ed2' which can be obtained by smoothing the PWM signal through the LPF 25, to the voltage comparator 7 as the voltage Ed'. And, by making the duty ratio of the PWM signal gradually smaller, the voltage Ed' is sequentially decreased less than the reference voltage Eo.

Thereby, the commutation ratio of the switch element 6 becomes greater than the commutation ratio of when the d-c voltage Ed of the condenser 5 is 150 V, thereby the d-c voltage Ed of the condenser 5 sequentially increases from 150 V so as to increase the revolution number of the electric motor 14. And, together with this, the room temperature further increases, and the measured room temperature reaches to the set room temperature.

As in the above, in case that the input a-c source voltage is 100 V, by exchanging respective switches, it is possible to output the drive signals of the switch element 6 and the inverter 13 from the micro computer 15 with a single port. In case that the commutation ratio of the switch of the inverter 13 is 100%, the instruction voltage Ed2' (the PWM signal) is outputted for varying the d-c voltage Ed as the power source voltage of the inverter 13, and in case that it is less than 100%, the control voltage (the PWM signal) is outputted for driving the inverter 13. And, for each case of those, with provision of a means (the drive signal exchange switch 22) for exchangeably outputting either the predetermined constant voltage for driving the switch elements of the inverter 13 at the commutation rate 100% or the inverter drive signal (the PMW signal) from the single port of the micro computer 15, such the control as mentioned above can be performed with using the micro computer 15 of relatively low in the function and low in a price, thereby it becomes possible to supply a product with a cheap price.

Further, when the commutation ratio is 100%, by controlling the d-c voltage Ed which is obtained by the condenser 5, the control of the revolution number of the electric motor 14 is performed.

Therefore, since when the commutation rate of on and off of the switch elements of the inverter 13 is less than 100%, in addition to setting the d-c voltage Ed1' at an arbitrary constant value of relatively low value, such as around 150 V by comparing the d-c voltage Ed1' with the constant reference voltage Eo, the revolution number of the electric motor 14 is controlled by making the switch element of the inverter 13 on and off at the arbitrary commutation rate, therefore, the loss in the inverter 13 or in the electric motor 14 can be decreased, thereby increasing the efficiency thereof.

Furthermore, when the commutation rate of the switch element of the inverter 13 is 100%, in place of the d-c voltage Ed1', an arbitrary instruction voltage Ed2' is exchanged to be supplied to the voltage comparator 7 so as to be compared with the reference voltage Eo, thereby changing the instruction voltage Ed2' depending on the desired revolution number of the electric motor 14. In this way, since the revolution number of the electric motor 14 is controlled at high or low by controlling the d-c voltage at the great or small value, without the chopper operation in the inverter 13, the chopper loss in the inverter 13 can be decreased.

With such the control of the revolution number, a reduction of the switching loss in the inverter 13 and an increase of efficiency through the inverter drive of the electric motor 14 with a low d-c voltage can be realized, and a high efficiency is accomplished.

Figure 4:
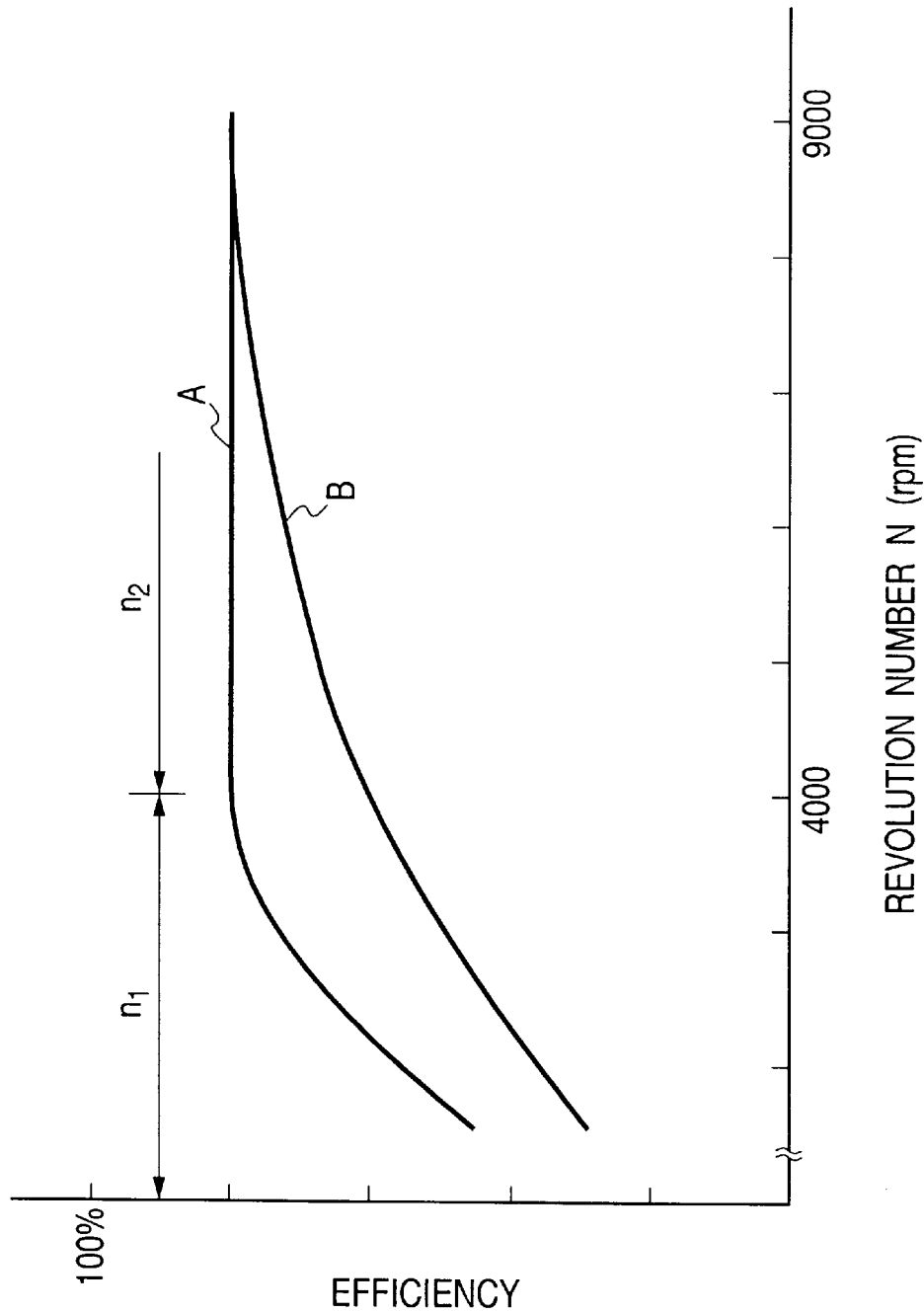
FIG. 4 is a drawing which shows effects according to the control method shown in FIG. 3 in comparison with a conventional art.

In FIG. 4 showing a relationships of the revolution number of the electric motor and the power factor, in comparison between the present embodiment and the conventional air conditioner, under a certain motor load, a symbol A shows a characteristics of the present embodiment performing the above function when the input a-c source voltage is 100 V, and B shows characteristics of the conventional air conditioner in which the d-c power source voltage of the inverter is maintained at constant, or of the present embodiment performing the above function when the input a-c source voltage is 200 V respectively.

In the same drawing, with the air conditioner in which the d-c power source voltage of the inverter is kept constant, such as at 300 V and the revolution number of the electric motor is controlled by the control in the commutation rate of the chopper of the inverter (hereinafter, called "conventional air conditioner"), the efficiency thereof is varies as the characteristics curve B with respect to the revolution number n (rpm) of the electric motor. That the efficiency increases together with the increase of the revolution number n is due to the increase in the commutation rate of the chopper of the inverter.

On the contrary to this, under the condition that the input a-c source voltage is 100 V and as mentioned above the commutation rate of the chopper of the inverter is less than 100%, and that the revolution number control of the electric motor is carried out by controlling the commutation rate of the chopper by the inverter with the constant d-c power source voltage of 150 V, when the commutation rate reaches to 100%, the efficiency of it varies as the characteristics curve A with respect to the revolution number n of the electric motor, in accordance with the embodiment in which the revolution number control of the electric motor is performed by controlling the d-c power source voltage of the inverter (hereinafter, called "embodiment with 100 V input"), therefore it is sufficiently higher than the efficiency B of the conventional air conditioner.

Here, it is assumed that a region $N_1$, in which the revolution number of the electric motor is low, is a region where the commutation rate of the chopper in the inverter is less than 100% in the embodiment with 100 V input, that a region $N_2$, in which the revolution number of the electric motor is high, is a region where the commutation rate of the chopper in the inverter is 100% in the embodiment with input 100 V, and that a maximum revolution number which can be obtained with the electric motor is 4000 (rpm) on a boarder between the regions $N_1$ and $N_2$, i.e., when the d-c power source voltage of the inverter is 150 V and the electric motor is driven by the chopper. And, in either of them, the d-c power source voltage of the inverter is 300 V and the revolution number of the electric motor is at 9000 (rpm) when the commutation of the switch elements of the inverter is at 100%.

In the conventional air conditioner, the d-c power source voltage of the inverter over a whole region including the regions $N_1$ and $N_2$ is 300 V, and the revolution number control of the electric motor is performed through the control of the commutation rate of the switch elements of the inverter. On the contrary, in the embodiment with 100 V input, the revolution number control of the electric motor is carried out by controlling the commutation rate of the switch of the inverter, by dividing the d-c power source voltage 300 V of the inverter to a half of it, i.e., 150 V, in the region $N_1$. Consequently, the efficiency of the embodiment with 100 V input becomes higher, for the lower voltage of the d-c power voltage.

And, in the region $N_2$, in accordance with the embodiment with 100 V input, the revolution number control of the electric motor is carried out by controlling the d-c power source voltage of the inverter, with the commutation rate 100% of the switch elements of the inverter but without chopping with the inverter. Therefore, though the efficiency becomes about constant, but as shown by the characteristics curve A, the efficiency becomes higher than the conventional air conditioner, for not conducting the chopping by the inverter.

However, when the revolution number of the electric motor reaches to about 9,000 (rpm), in the embodiment with 100 V input, the commutation rate of the inverter becomes 100% and the d-c power source voltage becomes 300 V, and it is in the same condition that the commutation rate of the inverter is 100% in the conventional air conditioner, therefore the characteristic curve A coincides with the curve B.

In the first embodiment shown in FIG. 1, further, the control of the electric power converter is carried out in the above procedures, and the arbitrary d-c voltage Ed can be obtained by appropriately setting the resistance values of the resistors R1, R2 and R3 for the sinusoidal synchronization signal Es', or by appropriately setting the resistance values of the resistors R4, R5 and R6 for the d-c voltage Ed', in both cases of the input a-c power source voltage is 100 V and 200 V, respectively, and the electric power converter can be obtained with less high harmonics and with a high power factor.

At this time, a detected output voltage of the input current detector 23 is supplied to the micro computer 15, and if it comes greater than the predetermined value, the micro computer 15 outputs a driving trigger signal VT for the switch element 6 (the first switch element) so as to initiate the switching operation. Consequently, in case that a supply current is great, a stable and high power factor can be obtained.

For example, in case that a resistor is used as a load current detector 9 and it is intent to obtain a current signal Vi on the voltage appearing across the both terminals thereof, there is necessity of generating sufficient voltage for the control even for very small current, in concretely, it is necessary to set the resistance value at large one. In the case, since the electric power which is consumed by the load current detector 9 of the resistor becomes large when the load current becomes large, it causes an increase of the loss. Therefore, for the purpose of decreasing the loss, it must be as small as possible, and further, for protecting from an unstable operation for the very small detection voltage under the low load current, in particular when the detected output value of the input current detector 23 is smaller than the predetermined value, the switch 6 is inhibited to be driven. In this manner, the unstable operation under the low input current is prohibited, and the reduction in the loss under the high input is realized. And, by prohibiting the chopper operation of the switch element 6 under the low input current, it is also possible to reduce the loss as well as noises.

However, in FIG. 1, the active converter block 24 is constructed by combining and unifying as a block a driver portion of the active converter, a circuit exchange portion for 100 V/200 V, an exchange portion of the inverter drive signal and the d-c voltage instruction signal, etc., on the same substrate.

Figure 5:
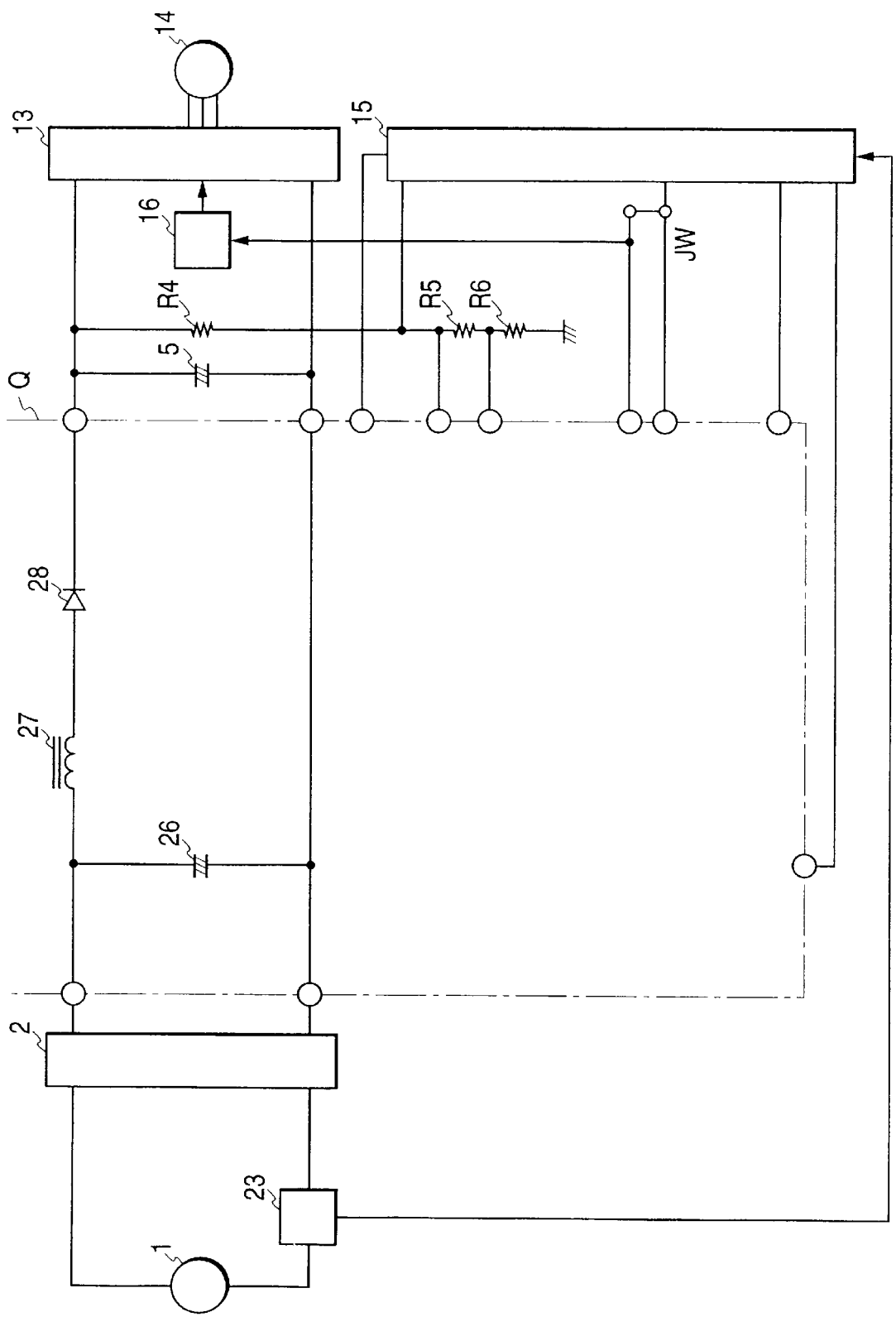
FIG. 5 is a block diagram showing a variation of the first embodiment shown in FIG. 1.

With the independent substrate construction of the active converter block 24 with respect to the other circuits, as shown in FIG. 5, substitution with a power factor improvement circuit Q which is constructed as a whole with passive elements, such as the condenser 26, the reactor 27, the diode 28 and so on is possible, and it is also possible to make it for common use with peripheral circuit boards including the micro computer 15.

Figure 6:
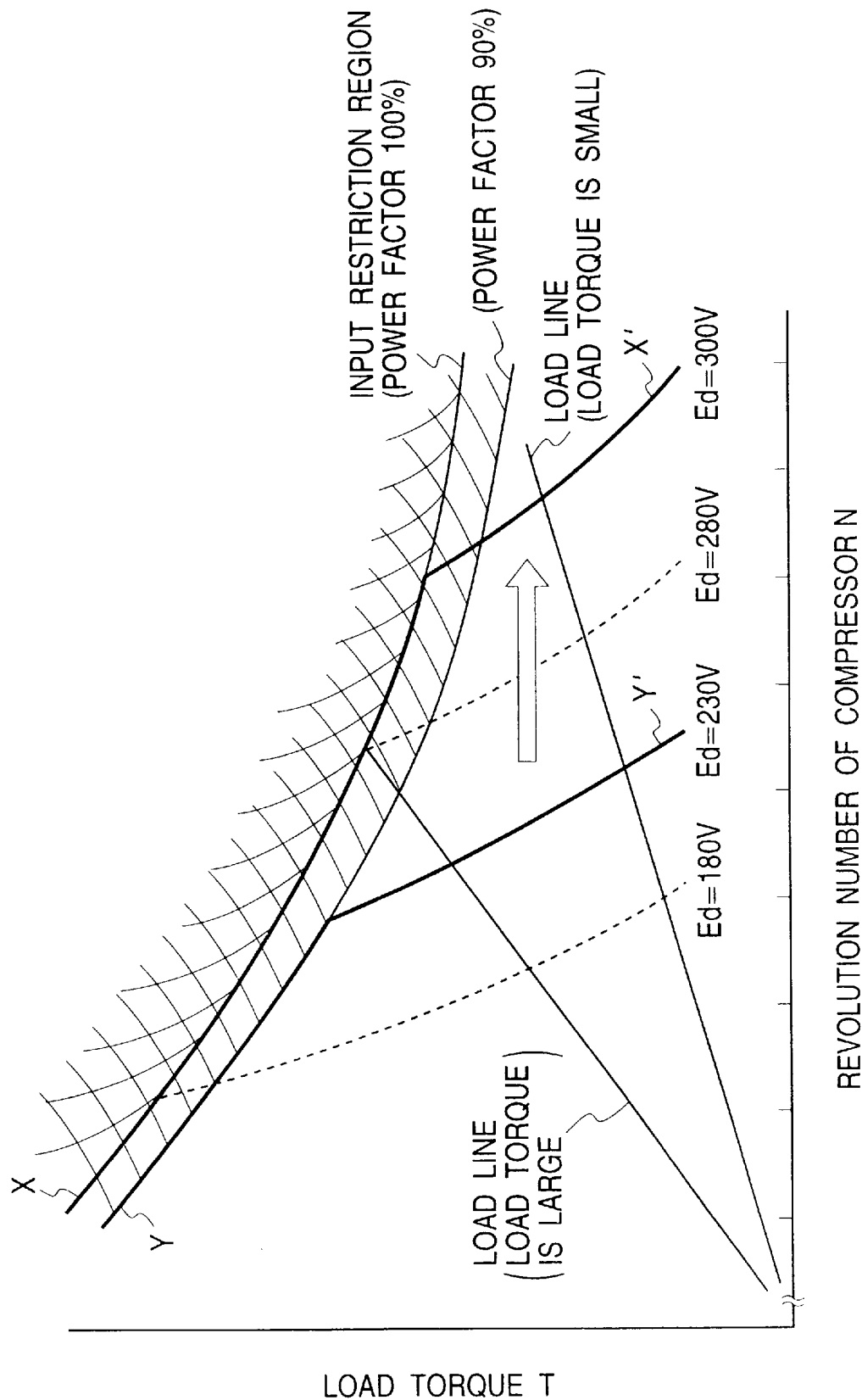
FIG. 6 is a drawing which shows the effects of the first embodiment shown in FIG. 1 and the air conditioner using the circuit shown in FIG. 5 in comparison.

FIG. 6 is a drawing showing output regions of the electric motor, in comparison, one in the air conditioner which is constructed with the passive elements shown in FIG. 5, and the other in the first embodiment which uses an active element and controls the revolution number of the electric motor depending on the d-c power source voltage of the inverter as shown in FIG. 1, in which the horizontal axis shows the revolution number N and the vertical axis the load torque respectively, and the output W of the electric motor is about proportional to N×T.

In the same drawing, the input current is restricted by a capacity of a breaker for home use (for example, 20A) and the maximum input (=input power source voltage×input current×power factor) is limited for the air conditioner. With the air conditioner using the circuit shown in FIG. 5, since the power factor is around 90%, the input restriction region (i.e., the region in which the electric motor can obtain as the output) is restricted in the region below a line Y. On the contrary, with the first embodiment mentioned above, since the power factor is improved to be about 100% as mentioned above, the input restriction region is in the region below the line X, thereby the effective electric power given to the electric motor is increased by 10% comparing to the air conditioner using the circuit shown in FIG. 5. And, in particular, when the load torque of the electric motor is large, it is limited with such the input restriction region.

And, if the revolution number of the electric motor increases, the maximum output region of the electric motor is restricted by the d-c power source voltage Ed of the inverter. Since the electric motor generates an induction voltage by the rotation of itself, no current flows under the low d-c voltage, and the revolution number does not increases higher than a certain value even with no load. In particular, the higher efficiency the electric motor shows in the lower speed region where the electric motor is driven most of the time in the practical use, the greater induction voltage is generated by it at the same revolution number, therefore there is tendency that the revolution number driven by the same d-c voltage decreases. Consequently, it is possible but only to rectify and smooth the a-c power source voltage. For example, with the construction shown in FIG. 5, the higher efficiency the electric motor shows, the much more difficult to increase the revolution number, and in its turn a problem of a trade off that it causes a decrease in the maximum output.

In the air conditioner using the circuit shown in FIG. 5, the d-c power source voltage Ed lies from about 230 V up to at the maximum about 280 V, and the restriction region of when Ed=230 V is indicated by a line Y'. It is only possible to draw out the output of the electric motor but in the region on the left side of the line Y'. On the contrary to this, in accordance with the above first embodiment, the d-c power source voltage Ed is 300 V in the example mentioned above, and it is variable from 150 V to 300 V, wherein the restriction region at the maximum 300 V is indicated by a line X'. From this regard, it is to say that the output region of the electric motor is enlarged, and it is possible to obtain a higher maximum output with using the electric motor of good efficiency, so as to dissolve the above-mentioned drawbacks.

Figure 7:
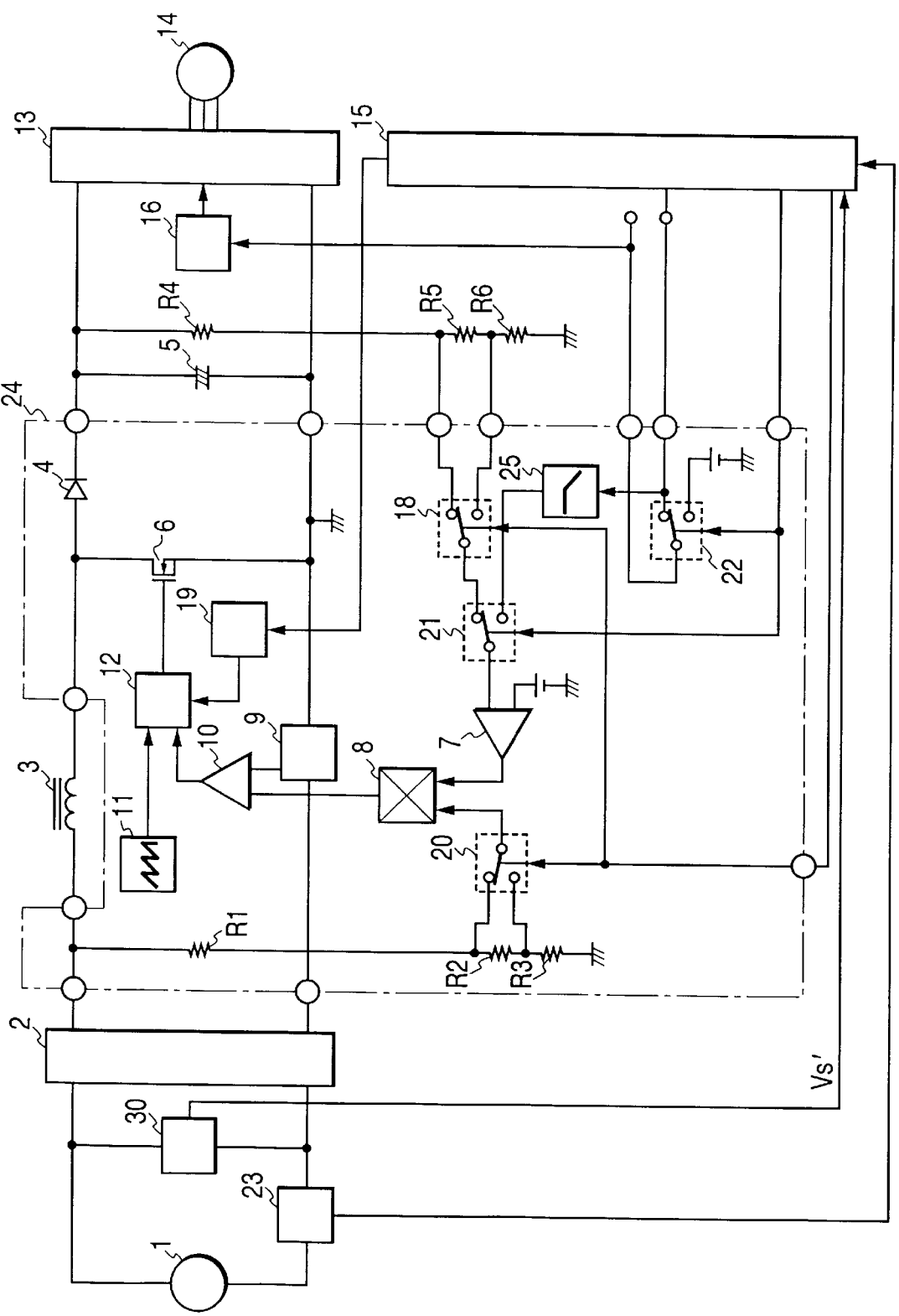
FIG. 7 is a block diagram showing a second embodiment of the air conditioner in accordance with the present invention.

In FIG. 7 showing block diagram of a second embodiment of the air conditioner, in accordance with the present invention, a reference numeral 30 is an a-c electric power source voltage detector, and the other corresponding elements shown in FIG. 1 are attached with the same reference numerals so as to eliminate duplication in explanation thereof.

In the same drawing, the difference from the first embodiment shown in FIG. 1 lies in that the a-c electric power source voltage detector 30 is provided, and it detects the input a-c electric power source voltage from the a-c electric power source 1. On the detected output signal Vs', the micro computer 15 decides the voltage of the input a-c electric power source. And, in accordance with a result of the decision, the d-c voltage exchange switch 18 and the synchronization signal exchange switch 20 are controlled to be exchanged, in the same manner as the first embodiment.

In those first and second embodiments, the decision of the input a-c electric power source voltage and the output of the control signal(s) are made by a software of the micro computer 15, however, they can also carried by a hardware such as an electric circuitry and it is also clear that the same effect can be obtained therewith.

Figure 8:
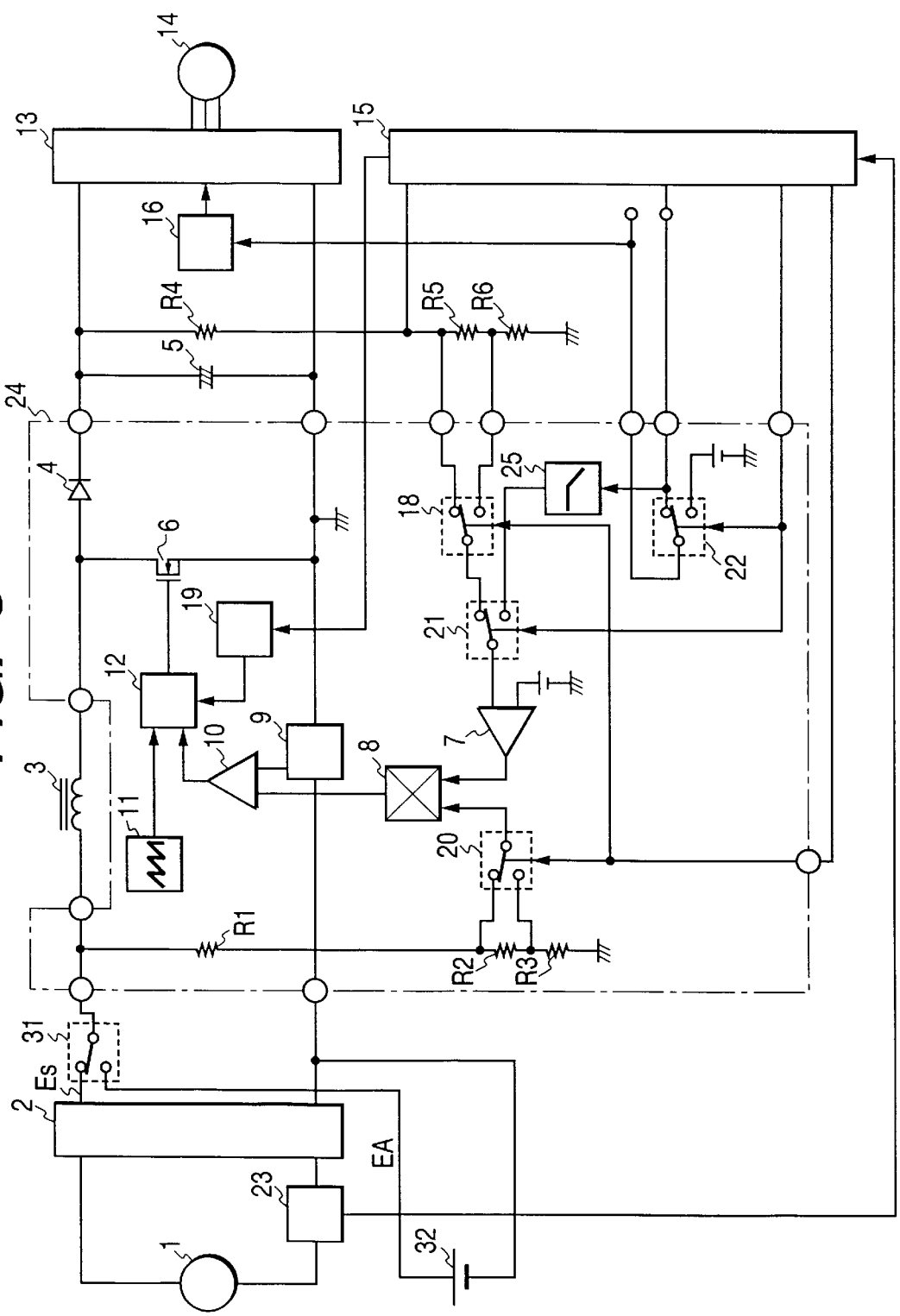
FIG. 8 is a block diagram showing a third embodiment of the air conditioner in accordance with the present invention.

In FIG. 8 showing block diagram of a third embodiment of the air conditioner, in accordance with the present invention, a reference numeral 31 is an a-c/d-c exchange switch, and the other corresponding elements shown in FIG. 1 are attached with the same reference numerals so as to eliminate duplication in explanation thereof.

In the same drawing, in accordance with the third embodiment, a d-c electric power source 32 (for example, about 150 V) such as a solar electric power source is also provided in addition to the rectifier 2, and it is constructed such that either one of the d-c electric power source voltage EA from it and the rectified voltage Es from the rectifier 2 can be selected by the a-c/d-c exchange switch 31, thereby it can be function as a booster circuit of the d-c voltage.

Figure 2:
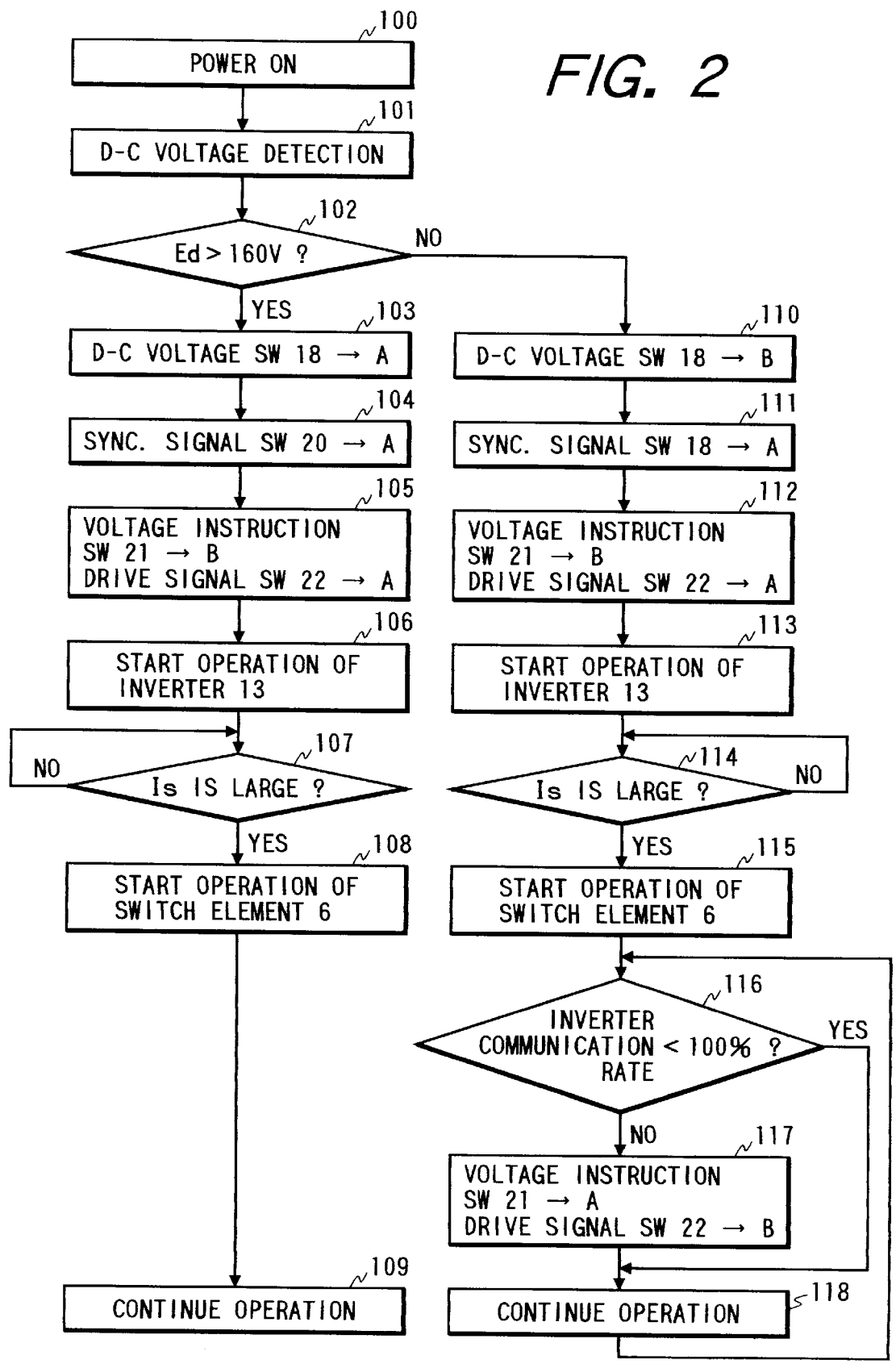
FIG. 2 is a flow chart showing a control method of the first embodiment shown in FIG. 1.

In case that the d-c electric power source voltage 32 is selected, the micro computer 15 conducts the same operation (the step 102) of when it decides that the d-c voltage of the condenser 5 is less than 160 V, in FIG. 2. Therefore, with this third embodiment, it is possible to drive the electric motor 14 with the d-c electric power source 32 of a low voltage.

When the d-c electric power source such as a solar battery is connected to the reactor 3 at the power source side, even with a fluctuation in the d-c electric power source voltage, it can be stabilized at the predetermined d-c voltage Ed. Thereby, irrespective of the fluctuation in the electric power source voltage of such as the solar battery and of kinds in the d-c electric power sources (the solar battery, a battery, a fuel battery, and so on), it can be connected to it. And, also the same effect can be obtained when the d-c electric power source is connected between a collector and an emitter of the switch element 6 through a diode and a reactor.

In case that the output d-c voltage EA of the d-c electric power source 32 is higher than the d-c voltage Ed which is obtained through the full-wave rectification of the input a-c electric power source voltage from the a-c electric power source 1, it is possible to conducts the control of the electric motor through the d-c electric power source 32 by automatically changing the a-c/d-c exchange switch 31, or to carry out the exchange of the circuit by a previous manual operation.

And, when the d-c voltage such as the solar battery is connected to the smoothing condenser 5 through the diode (not shown in the drawing), the electric power is supplied from the d-c electric power source if the output voltage of the d-c electric power source reaches to the desired d-c voltage mentioned above, and if it does not reaches to the desired d-c voltage mentioned, the electric power is supplied from the a-c electric power source so as to boost it to the desired d-c voltage, thereby controlling the revolution number of the electric motor 14 by turning on and off the switch element of the inverter 13. Thereby, a use in common of a commercial a-c electric power source and the d-c electric power source mentioned above, and less consumption of electric energy can be achieved.

Figure 9:
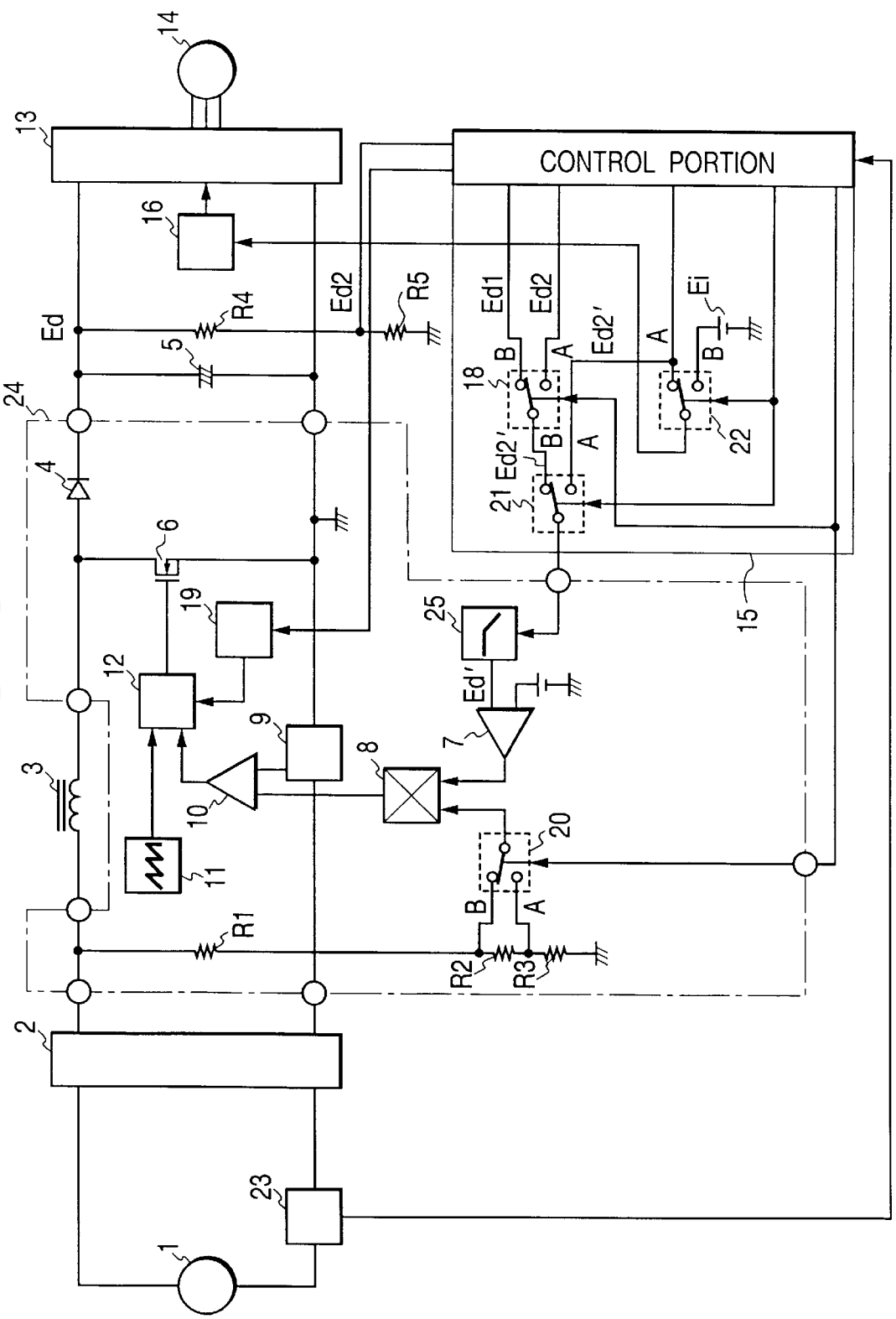
FIG. 9 is a block diagram showing a fourth embodiment of the air conditioner in accordance with the present invention.

FIG. 9 is a block diagram showing a fourth embodiment of the air conditioner, in accordance with the present invention, in which the other corresponding elements shown in FIG. 1 are attached with the same reference numerals so as to eliminate duplication in explanation thereof.

In the same drawing, the difference from the first embodiment shown in FIG. 1 is in that the micro computer 15 also has the functions of the d-c voltage exchange switch 18, the voltage instruction exchange switch 21 and the drive signal exchange switch 22, and that an output port to the inverter driver circuit 16 and an output port to the voltage comparator 7 are provided independently.

The micro computer 15 outputs a signal for exchanging the synchronization signal exchange switch 20 depending on the input electric power source voltage, in the same manner as the first embodiment, and it reads in the divided d-c voltage Ed1 of the d-c voltage Ed which is converted by an A-D conversion. And, corresponding to the input electric power source voltage of 100 V or to the input electric power source voltage of 200 V, the d-c voltage Ed' is obtained, depending on the divided d-c voltage Ed1, and the PWM signal having such the duty ratio is formed and outputted that the d-c voltage obtained by integration is equal to the d-c voltage Ed'. The PWM signal is smoothed by the low pass filter 25 to be the d-c voltage Ed' and supplied to the voltage comparator 7.

Such the operation by the software is corresponding to the operation by the hardware, i.e., the d-c voltage exchange switch 18, the voltage instruction exchange switch 21 and the drive signal exchange switch 22 are controllably exchanged depending on the d-c voltage Ed of the smoothing condenser 5 in the previous first embodiment and so on, so as to select either one of the divided voltage Ed1 or Ed2, and it can also perform the same operation, with more simplified construction, comparing to the operation by such the hardware.

As a signal to the inverter driver portion 16, the micro computer 15 supplies the constant voltage Ei of the predetermined value when the commutation rate of the switch elements (the second switch element) of the inverter 13 is 100%, and it supplies the control voltage (the PWM signal) when the commutation rate is less than 100%.

Also as the d-c voltage Ed' to the voltage comparator 7, the instruction voltage Ed2' (the PWM signal) for changing the d-c voltage Ed is supplied when the above commutation rate is 100%. The PWM signal is smoothed by the low pass filter 25 to be the d-c voltage Ed, and is supplied to the voltage comparator 7.

On a while, when the commutation rate is less than 100%, the micro computer 15 obtains the predetermined low d-c voltage Ed' from the divided d-c voltage Ed2 (or the d-c voltage Ed), and outputs the PWM signal of such duty ratio that it comes to be equal to the low d-c voltage Ed' by integration thereof. The PWM signal is smoothed by the low pass filter 25 to be the d-c voltage Ed' and is supplied to voltage comparator 7.

Therefore, as to a peripheral circuit such as a switch for exchanging the voltage, it can be greatly reduced in the number of parts by making the micro computer 15 perform the same function, especially if multi-step exchange function is needed for it, and also the number of wiring to the respective switches can be reduced, thereby increasing a reliability as well as an anti-noise characteristics, greatly.

Here, it is needless to say that the embodiment shown in FIGS. 7 through 9 also performs the same operation to that which is explained in FIGS. 2 and 3, in the same manner as shown in FIG. 1, and can obtain the effects which are explained by referring to FIGS. 4 and 6.

As the embodiment mentioned above, in case of achieving the control of driving the electric motor by boosting the d-c voltage to the arbitrary value, and achieving the decision of the electric power source voltage by the d-c voltage after being rectified and smoothed, there is not necessarily correlation between the d-c voltage at driving and the a-c electric power source voltage. Therefore, the electric charge which is charged by the voltage applied during the previous operation must be fully discharged before making the decision.

Ordinarily, there is no problems since it is discharged through a discharge resistor, etc., however, there is some defect in the discharge system or simultaneous interruption during the operation, it is conceivable that the d-c voltage is remained at high level depending on the previous operating condition.

For example, in case that the electric power source voltage is simultaneously interrupted during the operation, the micro computer 15 is reset, and it tries to make the decision of the electric power source voltage, again. In this case, within a very short time period after the simultaneous interruption of the electric power source, it is not enough for the electric charge charged in the smoothing condenser to be discharged, and for example if it is driven with Ed=300 V, there is remained a possibility of mischievously acknowledging that the decided a-c electric power source be the high a-c electric power source voltage.

Further, as a method of detecting the a-c voltage, there is generally known a method, in which the electric power source voltage is boosted by using an induction transformer and a secondary output thereof is rectified and smoothed to be judged by the d-c voltage value. However, while an output proportional to the electric power source voltage can be easily obtained, there is problems of cost-up of the induction transformer itself, i.e., an increase in the loss due to electric conduction to the transformer, and maintaining of a space for installation thereof.

Then, a fifth embodiment according to the present invention will be explained, in which the miss-judgment of the a-c electric source voltage is prevented by previously discharging the electric charge charged in the smoothing condenser before making the decision when the micro computer is reset, with effectively using the judgment on the d-c voltage of the smoothing condenser, which is advantageous from the view points of the cost, the less consumption of electric power and the less space for installation.

Figure 10:
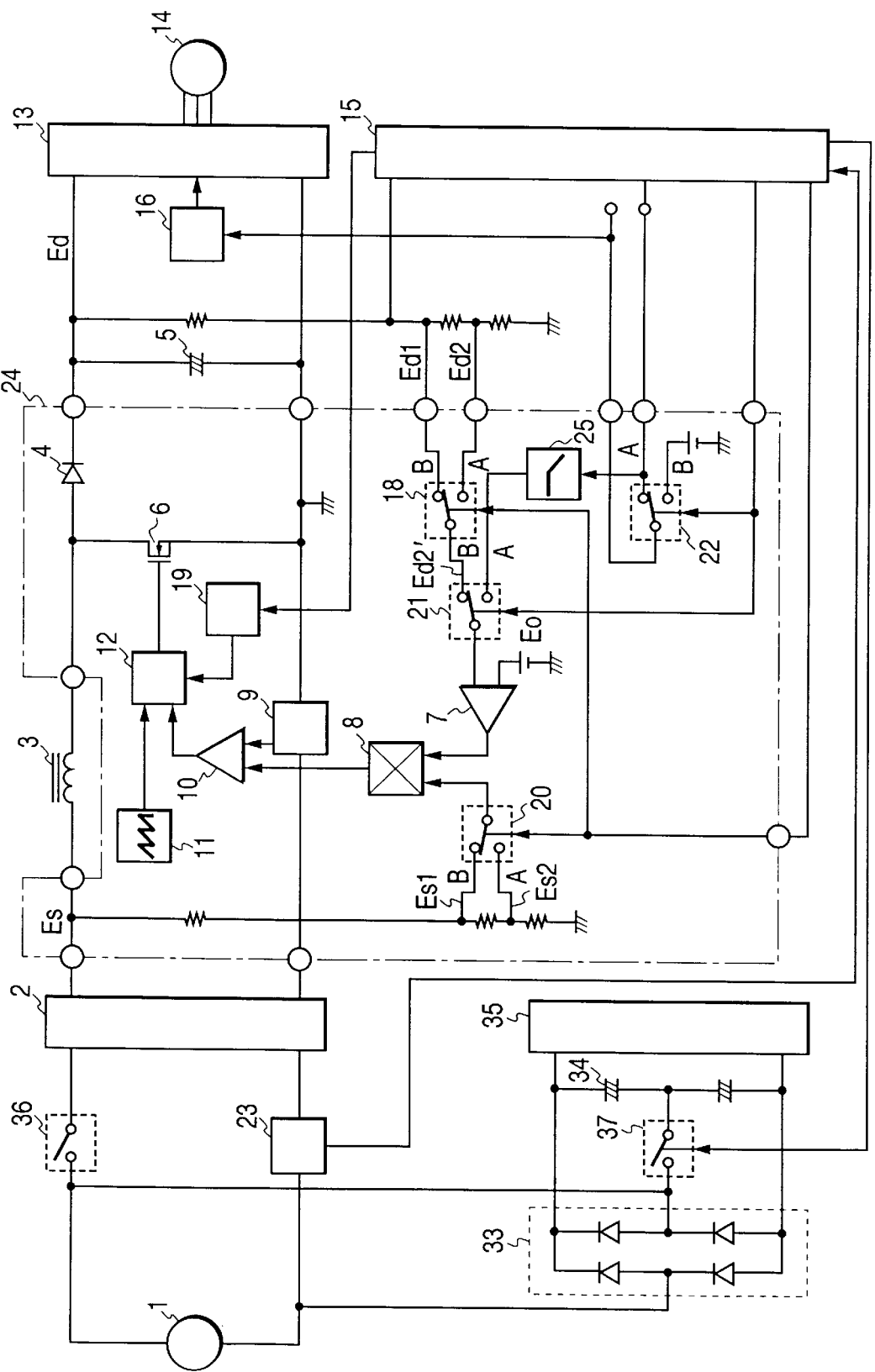
FIG. 10 is a block diagram showing a fifth embodiment of the air conditioner in accordance with the present invention.

In FIG. 10 showing a block diagram of the fifth embodiment of the air conditioner according to the present invention, the reference numeral 33 is a rectifier for rectifying the a-c electric power source voltage, 34 a smoothing condenser for smoothing the rectified voltage by the rectifier 33, 35 a transformer circuit for converting the d-c voltage smoothed by the smoothing condenser 34 to arbitrary plural kinds of voltage, 36 a power relay for connecting between the a-c electric power source 1 and the rectifier 2, and 37 a exchange relay for exchanging the connection construction of the rectifier 33 in either one of the full-wave rectifier or a voltage doubler rectifier, in which the other corresponding elements shown in FIG. 3 are attached with the same reference numerals so as to eliminate duplication in explanation thereof.

Figure 11:
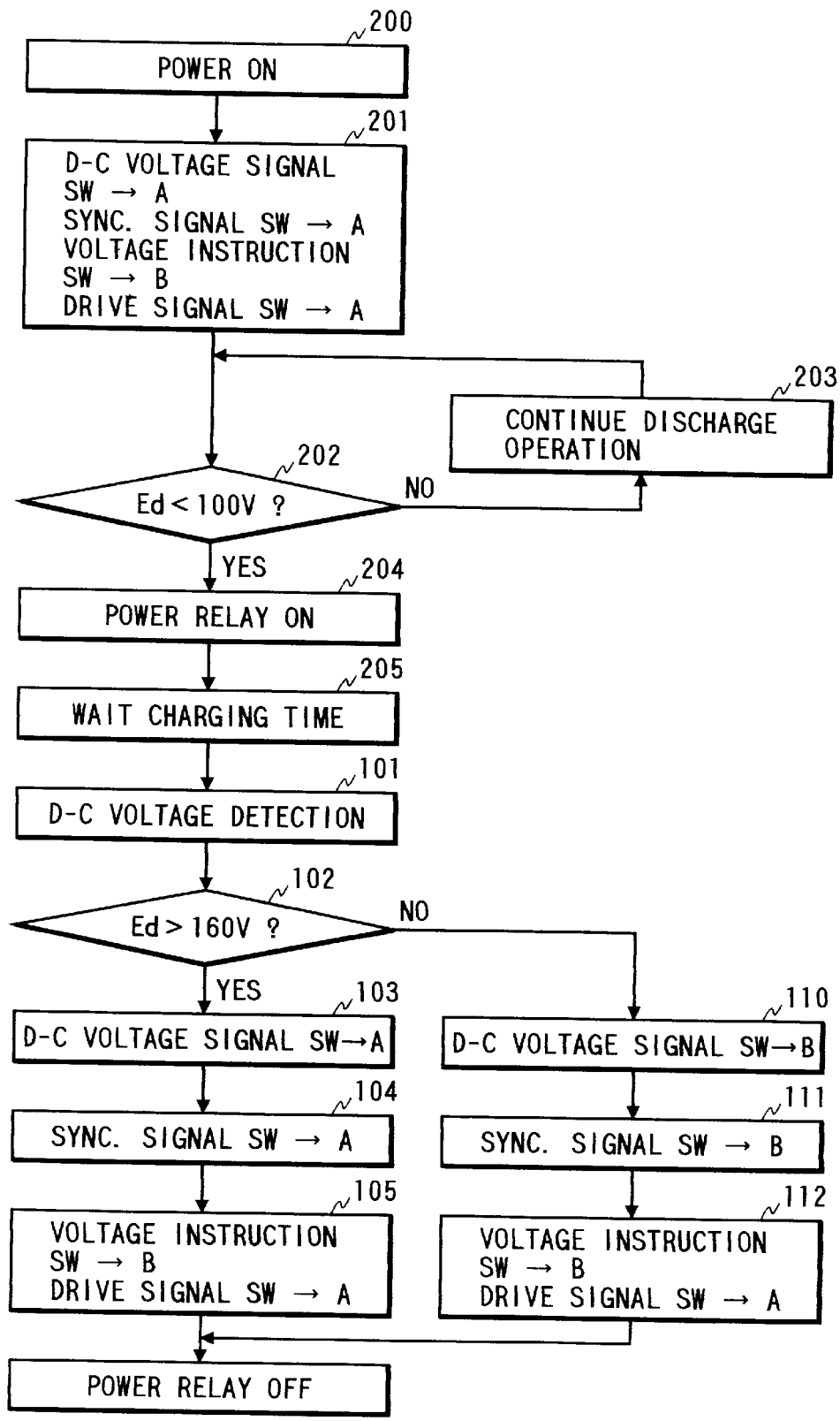
FIG. 11 is a flow chart showing the control method of the fifth embodiment of the air conditioner in accordance with the present invention.

Next, the controlling method of the fifth embodiment will be explained by referring to FIG. 11.

First, when the a-c power source is turned on (a step 200), the micro computer 15 is initialized, thereby the micro computer 15 turns the contact points of a d-c voltage exchange switch 18 and the synchronization exchange switch 20 to the side A, the contact point of the voltage instruction exchange switch 21 to the side B, and the contact point of the drive signal exchange switch 22 to the side A, respectively. Thereby, the d-c voltage exchange switch 18 selects the d-c voltage Ed2, and the synchronization exchange switch 20 selects the sinusoidal synchronization signal Es2 (a step 201).

Here, the power relay 36 is in non-conductive condition, and before making judgment of the input a-c voltage, it is decided whether the d-c voltage Ed is sufficiently lowed d-c voltage Eth (for example, 100 V) for making the judgment without a hitch (a step 202).

If Ed>Eth, the power relay remains in the non-conductive, it makes the electric charge in the smoothing condenser 6 discharge through the electric motor 14 by turning on an arbitrary one phase of the upper arms of the inverter 13 and an arbitrary phase of the lower arms of the phases different from the phase of the upper arms (a step 203).

In this time, the switch element (not shown in drawing) of the upper arm of the inverter 13 is turned on and off at an arbitrary duty ratio, and the current conducting into the electric motor 14 is formed by the chopper current I1 and a circulating current I2.

Here, the current supplied from the smoothing condenser 5 is the chopper current I1, and even if an electric charge is remained in the smoothing condenser 5, it discharges as expressed by the following equation:

$$Ed(t)=Ed(0)\times exp\{(-D_0^2\times t)/(R\times C)\}$$

Where,

Ed(0): an initial d-c voltage, $D_0$: an arbitrary duty, t: a past time,

R: a winding resistance of the electric motor, and

C: a capacitance of the smoothing condenser, and this discharge operation is continued until when it is Ed<Eth.

In this manner, this construction is advantageous for low cost and small sizing, since there is no necessity of newly adding, especially, the discharge resistor, etc., as a discharge means for the smoothing condenser 5, by using the inverter 13 and the electric motor 14 which are already provided.

However, when the smoothing condenser 5 is previously discharged, there if no necessity of conducting the above operation.

Next, when the power relay 36 is made on (a step 204), an electric charge depending on the a-c electric power source voltage is charged into the smoothing condenser 5 from the a-c electric power source 1 through the rectifier 2 and the reactor 3.

Waiting for a time necessary for generating the d-c voltage corresponding to the a-c voltage, the micro computer 15 detects the divided voltage Ed1 of the d-c voltage Ed of the condenser 5 (a step 101). With the voltage value of the detected d-c voltage Ed1 which is expressed by the following equation:

$$Ed=Ed1\times(R4+R5+R6)/(R5+R6)$$

the d-c voltage Ed is decided to be the input a-c electric power source 200 V, for example if it is higher than 160 V (a step 102), and is decided to be the input a-c electric power source 100 V, for example if it is lower than 160 V (a step 102).

The operation following to the above is same to those which were explained by the flow chart shown in FIG. 2.

In this manner, by discharging the electric charge charged in the smoothing condenser 5 previously before judging the a-c electric power source voltage, miss-judgment of the a-c electric power source voltage can be prohibited.

Further, in FIG. 10, depending on the fact to which class of the above-mentioned power source voltage the input a-c electric power source voltage belongs, the construction of the rectifier 33 is changed by turning on and off the exchange relay 37, thereby it becomes possible to select the construction of either the full-wave rectifier or the voltage doubler rectifier with the smoothing condenser 14. For example, in case that the input a-c electric power source voltage is decided to be 100 V, the rectifier 33 is changed to the voltage doubler rectifier by turning on the exchange relay 37, and if it is decided to be 100 V, the rectifier 33 is changed to the full-wave rectifier by turning off the exchange relay 37. The d-c voltage obtained by the smoothing condenser 34 is appropriately converted through the controlled power source circuit 35, thereby being obtained the d-c electric power source voltages for the voltage comparator 7 or the multiplier 8, the load current detector 9, the current comparator 10, the oscillator 11, the driver circuit 12, the micro computer 15, the inverter drive circuit 16, the switches 18, 20, 21 and 22, the trigger element 19, the input current detector 23 and so on.

By performing the above-mentioned control, it is possible to suppress the fluctuation of the input voltage with respect to the controlled electric power source, thereby to increase a line regulation. Therefore, by adding the exchange relay 37, it is possible to obtain the stable output voltage easily independent on inputting the controlled power source.

As mentioned above, in case that the operation load is large, under the condition that the heating load is large, such as the outside air temperature is low, for example −10° C. or −15° C., by variably controlling the revolution number of the electric motor for driving the compressor with the PAM control of the mentioned-above for increasing the capability of heating, it is possible to continuously operate at the necessary high revolution number (with the embodiment, at 9,000 rmp of the preset maximum revolution number). In accordance with the PAM control mentioned above, the revolution number of the electric motor for driving the compressor can be controlled corresponding to the change in the heating load as shown in FIG. 13.

On the contrary to this, the heating capability for respective compressors of various types, as shown in FIG. 13, is shorten in the drive torque when the outside air temperature is low, especially through the drive of the electric motor with the PWM control, therefore, it is impossible to fully drive up to the necessary revolution number. And, if a compressor of large capacity is used, though it is possible to rotationally drive until the necessary revolution number, the heating capability is in excess, when the load is small, such as the outside air temperature is high, and it frequently repeats on and off of operation. Thereby, the fluctuation of the room temperature of up and down is caused frequently, then a comfortableness is lost and the consumption of the electric power becomes large. In the above, explanation is given for the heating operation, though there is a difference in a degree, a similar tendency will be shown for the cooling operation.

And, by adopting the circuitry construction which can be commonly used for both the PWM control and the PAM control to the inverter, an operation can be obtained with less consumption of electric power when the load is low and with high capability when the load is high. Namely, when the load is low for example under the high outside air temperature, the electric motor for driving the compressor is operated by the PMW control with a condition of low drive voltage and low revolution number and at a high motor efficiency so as to make possible to operate with small consumption of electric power. When the outside air temperature is low, the electric motor for driving the compressor is driven at a high revolution number with high drive voltage by changing to the PAM control, thereby it is possible to drive at the necessary heating capability.

About the wave-forms of the voltage and current resulted from the control in the above embodiment, explanation will be given by referring to FIGS. 14 through 17.

FIGS. 14(a)–14(c) show the wave-form of the a-c electric power source input of before and after being operating as the active inverter. Comparing to FIG. 14 (a) before the operation, the wave-form after the operation in FIG. 14 (b) is at 100% in the power factor and is less than 70% before the operation, since the current wave-form is formed by following the sinusoidal wave-form of the input voltage. FIG. 14 (c) shows an improvement in the power factor with an analogue method, as explained in FIG. 5, the power factor in this case is around 90%.

FIG. 15(a)–15(d) show the current of the reactor 3 and the inverter current (the flow from condenser 5→to inverter 13) before and after the exchanging between PWM/PAM. FIG. 15 (a) shows the reactor current before the exchanging to it when the revolution number is relatively low and under low load condition. In the drawing, "ON" indicates a time period where the switch element is turned on, and "Chopper Cycle" indicates the active converter chopper cycle.

FIG. 15 (b) shows the inverter current before the exchanging. A "Commutation Cycle" means a period for commutating current by sequentially turning on and off the plural switch elements for inverting the d-c voltage inputted to the inverter into the a-c voltage. A "Chopper Cycle" means the chopper cycle of the inverter, and "r" indicates ripples in the chopper components. FIG. 15 (c) shows the wave-form of the reactor current after the exchanging at a relatively high revolution number and with high load. FIG. 15 (d) shows the wave-form the inverter current after the exchanging, and it has a smoothly curved wave-form.

FIGS. 16(a)–16(d) show the wave-forms of the reactor current when controlling the voltage at a constant, for example 150 V with the PWM control with respect to the fluctuation in the load. FIG. 16 (a) shows it under light load, and an enlarged view in the time axis of a portion b in this FIG. 16 (a) is shown in FIG. 16 (b). FIG. 16 (c) shows it under high load, and an enlarged view in the time axis of a portion d in this FIG. 16 (c) is shown in FIG. 16 (d). As is clear from the FIG. 14, if the d-c voltage is the same (150 V), the duty of the switch elements is the same and the height of the current wave-form is changed depending on the magnitude of the load.

FIGS. 17(a)–17(d) show the wave-forms of the reactor current with respect to the d-c voltage, and FIG. 17 (a) shows the PWM region where the revolution number is relatively low and the voltage is constant (150 V). A view enlarged in the time axis of a portion b in this FIG. 17 (a) is shown in FIG. 17 (b). FIG. 17 (c) shows the PAM region where the revolution number is relatively high and the voltage is variable (150–300 V). An enlarged view in the time axis of a portion d in this FIG. 17 (c) is shown in FIG. 17 (d). Comparing those wave-forms in FIGS. 17 (c) and (d), an ON duty is widen in the PAM control region. Even though under no load condition, the ON duty is widen in the PAM control region so as to increase the d-c voltage.

An embodiment of the air conditioner is shown in FIGS. 18, 19 and 20, which is equipped with a refrigerating cycle for realizing the comfortable heating operation with less electric power consumption in the cold district (including cases in which the heating load is large when the operation is initiated, even in the other areas than the cold district) by combining the electric motor driver apparatus of the present invention to the embodiment of the air conditioner, and for enabling the purpose of reducing the electric power consumption by preventing from increase in compression work when the refrigerant ejection pressure of the compressor is high, and by suppressing the condensation pressure of the refrigerant at low. FIG. 18 is a drawing which shows a side cross-sectional view of an interior machine of the present embodiment. In FIG. 18, a reference numeral 101 indicates an interior heat exchanger of bent in multi-stage (3 stage) installed in the interior machine, which is constructed with a front lower portion 102 and portions bridging from a front upper portion 103 to a rear face portion 104 thermally divided by a thermal cutting line 124 in the interior machine. And, a reference numeral 126 indicates an interior auxiliary heat exchanger which is positioned at a side of an upper flow or stream of the interior heat exchanger 101 under the dehumidification operation or cooling operation, and at the lower or down flow side thereof under the heating operation. In those heat exchangers, a reference numerals 120 marked by a mark "O" indicates a heat transfer pipe provided penetrating a heat radiation fins 123 of a plurality of pieces, and a reference numeral 121 and a broken line 122 indicate connecting pipes for the same heat transfer pipes 120. Further, a reference numeral 105 indicates a throttle valve apparatus for dehumidification having choking function under the dehumidification operation, to one of connecting ports of the dehumidification throttle valve apparatus 105 are connected the front upper portion 103 and the rear face portion 104 being combined as an unit thermally through a connecting pipe 106, and to the other connecting port of the dehumidification throttle valve apparatus 105 is connected the front lower portion of the thermally divided interior heat exchanger 101 through a connecting pipe 107.

And reference numeral 109 indicates an interior fan of an one-through or flow through type, 110 a front face suction grill, 111 an upper suction grill for whole face, 112 an upper rear face grill, 113 a filter, 114 a rear face casing, 115 an outlet, and 116 a wind direction plate at the outlet, and the air in the room is sucked by the interior fan 9, as indicated by arrows 191, 192, 193, through the front face suction grill 110, the whole face upper suction grill 111, the upper rear face suction grill 112 and the filter 113 and is blown out from the outlet 115 through the interior fan 109 after heat exchanging with the refrigerant in the interior heat exchanger 101 which is bent in multi-stage.

A reference numeral 117 denotes a dewdrop receiving plate for the front face portions 102 and 103 of the interior heat exchanger 101 bent in multi-stage, and 118 a dewdrop receiving plate for the rear face portion 104 of the interior heat exchanger 101 bent in multi-stage. Both of them perform the function of receiving dehumidified water generated during the cooling operation or the dehumidification operation.

FIGS. 19(a) and 19(b) are drawings which shows an embodiment of the dehumidification throttle valve apparatus 105 shown in FIG. 18, in which FIG. 19 (a) shows an actuation condition of the dehumidification throttle valve apparatus 105 under a dehumidification or drying operation and FIG. 19 (b) shows another actuating condition of the dehumidification throttle valve apparatus 105 under the cooling and heating operation. In those drawings, a reference numeral 130 denotes a valve main body, 131 a valve sheet, 132 a valve body, 133 a valve portion of the valve body 132, 134 and 135 connecting pipes, 136 an electromagnetic motor for moving the valve body 132, and furthermore, big arrows 138 and 139 denote flow directions of the refrigerant (direction of piping) and an arrow 140 denote a flow direction of the refrigerant under the dehumidification or drying operation.

And, under the dehumidification or drying operation, as shown in FIG. 19 (a), the valve body 132 is in the condition of closing by the electromagnetic motor 136. At this time, the condensed liquid refrigerant of high pressure, which passes through the interior auxiliary heat exchanger 126 and the portions bridging from the front upper portion 103 to the rear face portion 104 of the interior heat exchanger 101, flows from the connecting pipe 134 into a narrow passage 137 defined in an aperture between the valve body 133 and the valve sheet 131, as indicated by an arrow 140, and after becoming the refrigerant of low pressure and low temperature here by receiving the choking function, it flows through the connecting pipe 135 into the front lower portion of the interior heat exchanger 101 operating as an evaporator.

As the result, the interior auxiliary heat exchanger 126 and the portions bridging from the front upper portion 103 to the rear face portion 104 of the interior heat exchanger 101 operate as a heater (re-heater) and the front lower portion 102 operates as a cooler, thereby the dehumidification or drying operation of heating and cooling the interior air at the same time to dehumidify is possible.

And under the cooling and the heating operations, as shown in FIG. 19 (b), the dehumidification throttle valve apparatus 105 is in fully closed condition by drawing up the valve body 132 with the electromagnetic motor 136. As a result, the connecting pipes 134 and 135 are mutually connected to each other with almost no transmission resistance, therefore the refrigerant flows freely without resistance.

In FIG. 20 showing the cycle construction of the present embodiment as a whole, a reference numeral 150 denotes a compressor for compressing the refrigerant, which is variable in the capacity by a control in the revolution number, etc., 151 a fourway valve for exchanging the operation condition, 152 an exterior heat exchanger, and 153 an electric movable expansion valve without choking function and being able to fully open, wherein the refrigerating cycle is constructed with them by connecting them in circular with the connecting pipes, in addition thereto, the previously mentioned interior auxiliary heat exchanger 126, the multi-stage bent interior heat exchanger 101 and the dehumidification throttle valve 105. And, in FIG. 20, a condition of a flow path in an embodiment of a heat transmission pipe of the interior auxiliary heat exchanger 126 and the multi-stage bent interior heat exchanger 101 is shown schematically. The interior auxiliary heat exchanger 126 is constructed with a refrigerant flow path 159 of one system, and is connected with the connection pipe 129 to the interior heat exchanger 101.

The interior heat exchanger 101, in which the front upper portion 103 and the rear face portion 104 are connected as an one body, is so constructed that the heat transmission pipes form the refrigerant flow paths 154 and 155 in double system, and further, the lower heat exchanger portion 102, which is divided thermally by the cutting line 124, is constructed with two refrigerant paths 156 and 157. Further, the refrigerant paths 154 and 155, and 156 and 157 of those heat transmission pipes, are connected through the dehumidification throttle valve 105 by the connection pipes 106 and 107. Further, a reference numeral 158 is an exterior fan.

In the interior machine construction and the refrigerating cycle construction mentioned above, under the dehumidification or drying operation, by exchanging the four-way valve 102 at the same time of the cooling operation, by choking appropriately the dehumidification throttle valve 105 and by fully opening the electric movable expansion valve 153, the refrigerant is circulated, as indicated by an one-dotted chain line, in the order starting from the compressor 150, the four-way valve 151, the exterior heat exchanger 152, the electric movable expansion valve 153, the interior auxiliary heat exchanger 126, the front upper portion 103 and the rear face portion 104 of the interior heat exchanger 101, the dehumidification throttle valve 105, the front lower portion 102 of the interior heat exchanger 101, the four-way valve 151, and back to the compressor 150, thereby operating the exterior heat exchanger 152 as the condenser at upper flow side, the interior auxiliary heat exchanger 126 and the front upper portion 103 and the rear face portion 104 of the interior heat exchanger 101 as the condenser at the down flow side, and the front lower portion 102 of the interior heat exchanger 101 as the evaporator.

And, the air in the room is flown by the interior fan 109, as shown by arrows 191, 192 and 193, the interior air is cooled and dehumidified in the front lower heat exchanger portion 102 functioning as the evaporator, and at the same time it is heated by the interior auxiliary heat exchanger 126 and the front upper portion 103 and the rear face portion 104 of the interior heat exchanger as the condenser at the down flow side, i.e., the heater, further by mixing those air and is blown out inside of the room.

In this case, by controlling the capacity of the compressor 150 and the capacity in sending wind of the interior fan 19 and the exterior fan 158 with controlling the revolution number, it is possible to adjust the capacities of the cooler 102 and the heater 126, 103 and 104 so as to change the amount of the dehumidification and the temperature of the ejected air in a wide range.

Next, under the cooling operation, by opening the dehumidification throttle valve 105 and by choking the electric movable expansion valve 153 appropriately, the refrigerant circulates as indicated by an arrow of a solid line, thereby operating the exterior heat exchanger 152 as the condenser, and operating the interior auxiliary heat exchanger 126 and the multi-stage bent interior heat exchanger 101 as the evaporator so as to perform the cooling inside of the room.

Under the heating operation, with exchanging the four-way valve 151, opening the dehumidification throttle valve 105 and choking the electric movable expansion valve 153 appropriately, the refrigerant is circulated as indicated by an arrow of broken line, thereby operating the multi-stage bent interior heat exchanger 101 at the upper flow side in the refrigerant path as the condenser, the interior auxiliary heat exchanger 126 at the down flow as an excessive cooler, and the exterior heat exchanger 152 as the evaporator so as to perform the heating inside of the room.

And, for the cooling and the heating operations, there is necessity of driving with high efficiency with maintaining a cycle performance and the performance of heat exchange in the multi-stage bent interior heat exchanger 101 and the interior auxiliary heat exchanger 126.

Hereinafter, explanation will be given on the method of this.

In FIG. 20, under the cooling operation, the refrigerant flows from the interior auxiliary heat exchanger 126 to the multi-stage bent interior heat exchanger 101, and the both heat exchangers operate as the evaporator in which a voluminous flow amount of the gas refrigerant of low pressure is large. Then, the presser loss at the location of small cross-section becomes large and the performance of the cycle is decreased. Therefore, in FIG. 20, the refrigerant paths 154 and 155, and 156 and 157 of two systems are constructed with the portions 103 and 104 bridging from the front upper to the rear face of the multi-stage bent interior heat exchanger 101 and the front upper portion 102, respectively. As a result of this, the pressure loss in the refrigerant path is becomes sufficiently small, thereby it is possible to minimize the decrease in the performance enough. Further, since the heat exchange area as the evaporator can be increased by providing the interior auxiliary heat exchanger 126 or by providing the interior heat exchanger 1 bridging from the front face to the rear face, it is possible to improve the performance and to obtain increase in the performance in total.

Further for increasing the performance under the heating operation, a fully excessive cooling is necessary to be taken at the down flow side in the refrigerant path at the exit port of the interior heat exchanger operating as the condenser. And in the excessive cooling area, the refrigerant is in the liquid condition and at the same time the temperature of it decreases gradually from the condensation temperature, it is necessary to fasten the speed of the liquid refrigerant to increase the heat exchange inside of the heat transmission pipe, as well as to make the refrigerant flow and the air flow oppositing to each other, by positioning the heat transmission pipe at an upper side of the wind so as to exchange heat with the air flow of relatively low temperature before the heat exchange. Furthermore, since the temperature of the gas refrigerant of high temperature is decreased down to the condensation temperature at the upper stream portion in the inlet refrigerant path in the front lower portion 102 of the interior heat exchanger 101 under the heating operation, it is also preferable to direct the refrigerant flow and the air flow opposing to each other in this portion.

The interior auxiliary heat exchanger 126 is preferably positioned with a spacing aperture from 1 mm to 5 mm between the interior heat exchanger 101. With such the spacing aperture, the dew generated under the cooling operation is prevented from bridging between the both heat exchangers, thereby prohibiting the increase in air-flow resistance in the heat exchanger, so as to prevent from decrease in the cooling capacity and from increase in air blowing sound.

In FIG. 20, the interior auxiliary heat exchanger 126 being positioned at the exit port side of the condenser, since the refrigerant flow is one system in this portion and it can be reduced in cross-section area of the flow path enough, it is possible to increase the heat exchange rate sufficiently by fasting the refrigerant flow speed, and further it is positioned at the upper flow side of the interior heat exchanger 101. Therefore, the interior auxiliary heat exchanger 101 is able to show enough performance as the excessive cooler. In the front lower portion 102 of the interior heat exchanger in which two systems 156 and 157 are formed in the refrigerant path, the piping construction is such that the inlet side of the high pressure gas refrigerant under the heating operation is located at down stream side of the air flow and that the refrigerant flow and the air flow are opposing to each other in the heat exchanger portion 2, therefore it is possible to increase the heat exchange performance.

Next, in the construction of the interior machine in FIG. 18, from the distribution in wind speed of suction air indicated by arrows 191, 192 and 193 in the multi-stage bent interior heat exchanger 101, the wind 191 corresponding to the front lower portion 102 is relatively fast. Further, from a view point of ornamental design, as shown in FIG. 21, there is a probability of a case that the interior machine is constructed such an upper portion 180 in the front of the interior machine is sealed not to use as an air suction port and a suction grill 181 is provided only in the lower portion thereof.

In such the case, as is shown by an representative example in FIG. 21, the performance in the cooling and the heating can be increased by providing the auxiliary heat exchanger 126 in the front lower portion 102 of the interior heat exchanger 101 at the upper stream side in wind. Namely, under the cooling and the heating operations, since the wind amount corresponding to the arrow 191 is relatively large, though the interior auxiliary heat exchanger portion formed with the interior auxiliary heat exchanger 126 and the front lower portion 102 of the interior heat exchanger corresponding to the wind amount increases in the thickness in depth direction into which the wind flows, a temperature efficiency of this heat exchanger portion can be maintained at relative high value. Further, since the auxiliary heat exchanger 126 to be in the air-flow resistance is provided in the interior heat exchanger 101 at a position where the wind speed distribution is fast (more or less), the wind speed distribution of the suction air in the front face of the interior heat exchanger 101 becomes flat in total. As a result of those, with the construction of the interior machine shown in FIG. 21, it is possible to increase in the performance of the cooling and the heating, in comparison with the construction of the interior machine shown in FIG. 18.

Up to here, as the interior heat exchanger is considered only a construction in which it is provided bridging from the front face to the rear face of the interior machine, however, not limiting to that, with a construction of the interior machine in which the interior heat exchanger is provided only onto the front face of the interior machine but not to the rear face and the auxiliary heat exchanger is provided at the upper wind side thereof (not shown in drawing, however, it is corresponding to the case in which the rear face portion 104 is omitted from the interior heat exchanger 101 shown for instance in FIG. 18 or FIG. 21), it is possible to obtain similar effect of the interior auxiliary heat exchanger as explained in the above.

According to an experiment on the air conditioner equipped with the above interior auxiliary heat exchanger 126, between the temperature $-10°$ C. and $-15°$ C. of the outside air, a suction concentration of the refrigerant gas is smaller at the $-10°$ C. and the amount of compression work becomes small, therefore, the electric motor for driving the compressor can be driven at high revolution number for a long time. This is because, through increase in the condensation amount of the refrigerant with the interior auxiliary heat exchanger 126, the amount of work of the compressor is reduced by suppressing or decreasing the increase in the refrigerant gas pressure which is sucked into the compressor, thereby the driving current value is reduced and does not reach to the restricted current value in spite of driving at the preset maximum revolution number (9,000 rpm) for a long time.

Thereby, a drawback that, for example, according to the experiment made without the interior auxiliary heat exchanger 126 but with the PAM control, under the condition of the outside air temperature of $-10°$ C. and $-15°$ C., the condensation pressure increases and reaches to the restricted current before the room temperature reaches to the preset temperature, i.e., 23° C., and the control is shifted into that the revolution number is limited between 5,000 and 7,000 rpm, thereby taking a very long time to reach to the preset temperature. This is corresponding to the heating capacity similar to that of a fuel fan heater when the outside air temperature is at −15° C., and further the fee for the electricity can be made similar to the fuel price needed for the fuel fan heater.

As explained in the above, according to the present invention, it becomes possible to control the set value of the d-c voltage arbitrary by detecting the supplied a-c electric power source voltage. For example, in case that the a-c electric power source of 100 V is supplied, the loss can be diminished by controlling without the chopper of commutation of 100% with the arbitrary d-c voltage greater than 100 V, rather than controlling the revolution number by operating the chopper at the arbitrary commutation rate with a constant d-c voltage of about 300 V, therefore, exchanging the set value of the d-c electric power source voltage depending on the supplied a-c electric power source voltage is effective for achieving the high efficiency.

And, according to the present invention, it becomes possible to control the set value of the sinusoidal synchronization signal, and to provide the electric power converter with a stable d-c voltage and with high power factor and less high harmonics, even if the electric power source voltage supplied is changed.

Further, according to the present invention, triggering the switch element by detecting the supplied current, since the high power factor is not necessary especially when the supplied current is small, can exclude the unstable operation of the control when supplying a low current, the loss in excess and noises.

Furthermore, according to the present invention, it is possible to provide an electric motor driver apparatus which does not change the performance and the operation with respect to both the supplied electric power source voltages 100 V and 200 V, thereby preventing from diversification of machine types of the electric motor driver apparatus, obtaining an unification of the machine types, and making possible to increase the productivity together with reduction in prime cost thereof.

Furthermore, according to the present invention, by making the block including the switch element independent as a same substrate, substitution with the power factor improve circuit constructed with the conventional passive elements becomes easy, thereby enabling common use of the control circuit, and making the extension of the machine types and quick supply of new products easier with ease.

Furthermore, according to the present invention, it is also possible to connect with the d-c electric power source such as the solar battery, and in this case, since it is possible to vary or boost the d-c voltage by the switching element of next stage, it is possible to drive the electric motor with a relative low d-c voltage.

Furthermore, according to the present invention, since it is possible to reduce the number of parts greatly by installing the peripheral circuit, such as a group of switches, into an inside of the micro computer, and also since the wiring to the group of switches deleted, it is possible to increase the reliability including the anti-noise characteristics.

Furthermore, according to the present invention, since, in addition to performing the revolution number control of the electric motor by the chopper operation at the predetermined low electric power source voltage of the inverter, the revolution number of the electric motor is controlled by controlling the electric power source voltage of the inverter when the commutation rate is 100% of the chopper operation in the inverter, the chopper loss of the inverter and the loss in the electric motor can be reduced greatly, thereby increasing the efficiency greatly.

Further, according to the present invention, since the a-c electric power source voltage is judged by detecting the supplied a-c electric power source voltage as the d-c voltage, especially there is no need to add a circuitry for detecting the a-c electric power source, and it is possible to exclude a fruitless cost-up and consumption of electric power, without increasing an installation area on the substrate, thereby providing an advantageous construction for the low cost, for less consumption of electric power, and for small sizing.

Further, by discharging the electric charge charged in the smoothing condenser previously before deciding the voltage, under the reset, it is possible to prevent from the miss-judgment of the a-c electric power source voltage. This is effective for the circuit construction of the present invention, in which the d-c voltage is boosted up to a arbitrary value to drive the electric motor.

Further, with the construction of the present invention, as a means for discharging the smoothing condenser are used the inverter and the electric motor which are provided previously, there is no need to newly add such the discharge resistor, etc., therefore being advantageous for the low cost and the small sizing.

Further, the construction of the converter for the controlled electric power source in the embodiment can be changed and selected, depending on class of the above power source voltage to which the above a-c electric power source voltage belongs, the stable output voltage can be easily obtained, independent on inputting the controlled power source.

Furthermore, with the air conditioner in accordance with the present invention, wherein the condensing pressure is reduced with the cycle construction in which the interior auxiliary heat exchanger is provided at the down flow side of the heater under the heating operation, moreover the revolution number of the electric motor is controlled by the chopper operation with the preset low electric power source voltage of the inverter, and the revolution number of the electric motor is controlled by the control of the electric power source voltage of the inverter when the commutation rate is 100% under the chopper operation in the inverter, it is possible to enlarge the heat exchange area under the cooling and the heating operations even with the interior machine of a compact size, thereby making possible the effective use of the interior auxiliary heat exchanger as the excessive cooler, especially under the cooling and the heating operations, so as to enable to improve the performance by suppressing the condensation pressure and to minimize the power consumption.

Furthermore, in accordance with the resent invention, for example, since the loss, when controlling the revolution number by the chopper operation of the inverter at an arbitrary conduction rate of with a constant d-c voltage around 300 V is less than that of when controlling without the chopper at the 100% conduction rate with an arbitrary d-c voltage greater than 150 V, it is effective for obtaining high efficiency.

Furthermore, in accordance with the present invention, wherein the revolution number of the electric motor is controlled by the chopper operation with the preset low power source voltage of the inverter, and the revolution number of the electric motor is controlled by controlling the power source voltage of the inverter when the conduction rate becomes 100% under the chopper operation with the inverter, therefore, it is possible to reduce the chopper loss of the inverter and the loss in the electric motor greatly and also to increase the efficiency greatly.

What is claimed is:

1. An air conditioner comprising:
   a rectifier for rectifying and outputting an input a-c voltage;
   a reactor;
   switch elements for voltage regulation for turning on and off the rectified output of said rectifier through said reactor;
   a smoothing condenser for producing a d-c voltage by smoothing the rectified output which is turned on and off by said switch elements for the voltage regulation and is supplied through a diode;
   an inverter for driving an electric motor with an output voltage which is provided by turning on and off of the switch elements inputting the d-c voltage outputted by the smoothing condenser;
   a room temperature sensor for measuring a room temperature; and
   control means for controlling the on and off of said respective switch elements, depending on a difference in temperature between the measured room temperature by said room temperature sensor and a set room temperature, to control a revolution number of the electric motor; wherein, said control means, in a high revolution number region within a region of the revolution number of the electric motor, controls the input voltage of the inverter at a magnitude of voltage depending on the revolution number by controlling said switch elements for voltage regulation, and drives the electric motor with an output voltage provided without chopping a current during a conduction period of the switch element of said inverter.

2. An air conditioner as defined in the claim 1, said control means, in the high revolution number region within the region of the revolution number of the electric motor, controls the input voltage of the inverter at a predetermined magnitude of voltage by controlling said switch elements for voltage regulation, and drives the electric motor with an output voltage provided with chopping the current during the conduction period of the switch element of said inverter.

3. An air conditioner comprising:
   an electric power converter, having:
     a rectifier for rectifying an input a-c voltage;
     a reactor;
     switch elements for voltage regulation for turning on and off the rectified output of said rectifier through said reactor;
     a smoothing condenser for producing a d-c voltage by smoothing the rectified output which is turned on and off by said switch elements for the voltage regulation and is supplied through a diode; and
     a control means for controlling a commutation rate of the on and off of said switch element for voltage regulation; and
   an inverter for inverting the d-c voltage produced with said smoothing condenser into an a-c voltage by turning on and off of the switch elements and for driving an electric motor therewith; wherein said control means comprises:
     voltage control means for outputting a voltage control signal depending on a difference between the d-c voltage produced and outputted by said smoothing condenser and a predetermined reference voltage;
     current reference calculation means for producing and outputting a current reference signal by multiplying a synchronization signal synchronized with the rectified output of said rectifier and said voltage control signal;
     current comparison calculation means for producing and outputting a modulation reference signal by calculating said current reference signal and a d-c current at output side of said rectifier; and
     comparison means for outputting a drive signal by comparing said modulation reference signal and a carrier signal outputted from a signal oscillator; and further comprising:
     means for controlling the revolution number of said electric motor by setting an arbitrary constant value by comparing the d-c voltage produced by said smoothing condenser to the reference voltage, and by turning on and off the switch elements of said inverter at an arbitrary commutation rate, when the commutation rate of the on and off of the switch elements of said inverter is less than 100%, and for inputting an arbitrary instruction voltage by changing thereto in place of said d-c voltage and for comparing it to the reference voltage, when said commutation rate is 100%; wherein the revolution number of said electric motor is controlled by changing said instruction voltage depending on a desired revolution number of said electric motor, driving said switch elements for voltage regulation on and off and controlling magnitude of the d-c voltage large or small.

4. An air conditioner as defined in the claim 3, further comprising means for outputting the drive control signal of said switch elements for voltage regulation and said inverter through a single port, and for outputting said instruction voltage so as to change the d-c voltage produced by said smoothing condenser when the commutation rate of the switch elements of said inverter is 100%, and for changing the commutation rate of the switch elements of said inverter when the commutation rate of the switch elements of said inverter is less than 100%, in each case thereof, for exchangeably outputting the predetermined voltage for driving said inverter at the commutation rate 100% or the inverter drive control signal of said single port.

5. An air conditioner comprising:
   an electric power converter, having:
     a rectifier for rectifying an input a-c voltage;
     a reactor;
     switch elements for voltage regulation for turning on and off the rectified output of said rectifier through said reactor;
     a smoothing condenser for producing a d-c voltage by smoothing the rectified output which is turned on and off by said switch elements for the voltage regulation and is supplied through a diode; and
     a control means for controlling a commutation rate of the on and off of said switch element for voltage regulation; and
   an inverter for inverting the d-c voltage produced with said smoothing condenser into an a-c voltage by turning on and off of the switch elements and for driving an electric motor therewith; wherein said control means comprises:
     voltage control means for outputting a voltage control signal depending on a difference between the d-c voltage produced and outputted by said smoothing condenser and a predetermined reference voltage;

current reference calculation means for producing and outputting a current reference signal by multiplying a synchronization signal synchronized with the rectified output of said rectifier and said voltage control signal;

current comparison calculation means for producing and outputting a modulation reference signal by calculating said current reference signal and a d-c current at output side of said rectifier;

comparison means for outputting a drive signal by comparing said modulation reference signal and a carrier signal outputted from a signal oscillator;

judgment means for detecting the d-c voltage produced in said smoothing condenser and judging in which one of voltage classes V1, V2, . . . Vn said input a-c voltage lies;

means for changing said voltage control signal and said synchronization signal depending on the voltage class to which said input a-c voltage belongs; and means for controlling the revolution number of said electric motor by setting an arbitrary constant value by comparing the d-c voltage produced by said smoothing condenser to the reference voltage, and by turning on and off the switch elements of said inverter at an arbitrary commutation rate, when the commutation rate of the on and off of the switch elements of said inverter is less than 100%, and for inputting an arbitrary instruction voltage by changing thereto in place of said d-c voltage and for comparing it to the reference voltage, when said commutation rate is 100%; wherein the revolution number of said electric motor is controlled by changing said instruction voltage depending on a desired revolution number of said electric motor, driving said switch elements for voltage regulation on and off, and controlling magnitude of the d-c voltage large or small.

6. An air conditioner as defined in the claim 5, wherein the revolution number of said electric motor is controlled by setting the d-c voltage at the arbitrary constant value by comparing said predetermined reference voltage and said d-c voltage produced by said smoothing condenser, and by turning on and off the switch elements of said inverter, when the input a-c voltage belongs to a predetermined region of said voltage classes V1, V2, . . . Vn.

7. An air conditioner as defined in the claim 5, wherein said switch elements for voltage regulation and said control means for constructing said electric power converter are provided on a same substrate.

8. An air conditioner as defined in the claim 5, wherein on said substrate are provided:

said switch elements for voltage regulation and said control means for constructing said electric power converter;

means for changing the voltage control signal depending on one of said voltage classes V1, V2, . . . Vn to which said input a-c voltage belongs;

means for exchanging between the arbitrary constant voltage for driving said inverter at the commutation rate 100% and the signal for driving on and off the switch elements of said inverter; and means for exchanging as said d-c voltage supplied to said voltage control means between the drive signal of said switch elements for voltage regulation and a signal proportional to said d-c voltage which is produced by said smoothing condenser.

9. An air conditioner comprising:
an electric power converter, having:
a rectifier for rectifying an input a-c voltage;
a reactor;
switch elements for voltage regulation for turning on and off the rectified output of said rectifier through said reactor;
a smoothing condenser for producing a d-c voltage by smoothing the rectified output, which is turned on and off by said switch elements for the voltage regulation and is supplied through a diode; and
a control means for controlling a commutation rate of the on and off of said switch element for voltage regulation; and
an inverter for inverting the d-c voltage produced with said smoothing condenser into an a-c voltage by turning on and off of the switch elements and for driving an electric motor therewith; wherein said control means comprises:
voltage control means for outputting a voltage control signal depending on a difference between the d-c voltage produced and outputted by said smoothing condenser and a predetermined reference voltage;
current reference calculation means for producing and outputting a current reference signal by multiplying a synchronization signal synchronized with the rectified output of said rectifier and said voltage control signal;
current comparison calculation means for producing and outputting a modulation reference signal by calculating said current reference signal and a d-c current at output side of said rectifier;
comparison means for outputting a drive signal by comparing said modulation reference signal and a carrier signal outputted from a signal oscillator; and
a d-c electric power source such as a solor battery, wherein said switch elements for voltage regulation are driven on and off, and further comprises:
input current detection means for detecting an input a-c current, wherein said control means controls the revolution number of said electric motor by controlling the magnitude of the d-c voltage in large or small with the on and off drive of the switch elements for voltage regulation, depending on the magnitude of said input a-c current.

10. An air conditioner as defined in the claim 9, wherein said d-c electric power source such as the solar battery is connected to said smoothing condenser through a diode, and the revolution number of said electric motor is controlled by turning on and off the switch elements of said inverter when the output voltage of said d-c electric power source reaches to said desired d-c voltage.

11. An air conditioner as defined in the claim 9, wherein said d-c electric power source such as the solar battery is connected to said reactor at the power source side.

12. An air conditioner as defined in the claim 9, wherein said d-c electric power source such as the solar battery is connected between a collector and an emitter of said switch elements for voltage regulation through said diode and said reactor.

13. An air conditioner comprising:
an electric power converter, having:
a rectifier for rectifying an input a-c voltage;
a reactor;
switch elements for voltage regulation for turning on and off the rectified output of said rectifier through said reactor;

a smoothing condenser for producing a d-c voltage by smoothing the rectified output, which is turned on and off by said switch elements for the voltage regulation and is supplied through a diode; and a control means for controlling a commutation rate of the on and off of said switch element for voltage regulation; and an inverter for inverting the d-c voltage produced with said smoothing condenser into an a-c voltage by turning on and off of the switch elements and for driving an electric motor therewith; further comprising:

input current detection means for detecting an input a-c current; wherein said control means inhibits the driving of said switch elements for voltage regulation, when a value of detected output of said input current detection means is less than a predetermined value, and said control means comprises:

means for controlling the revolution number of said electric motor by setting an arbitrary constant value by comparing the d-c voltage produced by said smoothing condenser to said constant reference voltage, and by turning on and off the switch elements of said inverter at an arbitrary commutation rate, when the commutation rate of the on and off of the switch elements of said inverter is less than 100%, and for inputting an arbitrary instruction voltage by changing thereto in place of said d-c voltage and for comparing it to said constant reference voltage, when said commutation rate is 100%; wherein the revolution number of said electric motor is controlled by changing said instruction voltage depending on a desired revolution number of said electric motor, and controlling magnitude of the d-c voltage in large or small.

14. An air conditioner as defined in the claim 13, further comprising means for outputting the drive control signal of said switch elements for voltage regulation and said inverter through a single port, and for outputting said instruction voltage so as to change said d-c voltage produced by said smoothing condenser when the commutation rate of the switch elements of said inverter is 100%, and for changing the commutation rate of the switch elements of said inverter when the commutation rate of the switch elements of said inverter is less than 100%, in each case thereof, for exchangeably outputting the predetermined voltage for driving said inverter at the commutation rate 100% or the inverter drive control signal of said single port.

15. An air conditioner as defined in the claim 13, further comprising:

judgment means for detecting the d-c voltage produced in said smoothing condenser and judging in which one of voltage classes V1, V2, . . . Vn said input a-c voltage lies; and means for changing said voltage control signal and said synchronization signal depending on the voltage class to which said input a-c voltage belongs.

16. An air conditioner comprising:

an electric power converter, having:
a first rectifier for rectifying an input a-c voltage from a a-c electric power source;
a reactor;
switch elements for voltage regulation for turning on and off the rectified output of said rectifier through said reactor;
a first smoothing condenser for producing a d-c voltage by smoothing the rectified output, which is turned on and off by said switch elements for the voltage regulation and is supplied through a diode; and a control means for controlling a commutation rate of the on and off of said switch element for voltage regulation; and an inverter for inverting the d-c voltage produced with said first smoothing condenser into an a-c voltage by turning on and off of the switch elements and for driving an electric motor therewith; further comprising:

judging means for detecting said d-c voltage produced and outputted by said first smoothing condenser and judging magnitude of said input a-c voltage;

drive means for differentiating the on and off drive condition of said switch elements for voltage regulation depending on a result of judgment of said first means;

a movable contact point positioned between said a-c electric power source and said rectifier; and discharge means for discharging electric charge charged in said first smoothing condenser; wherein said control means discharges the charged electric charge of said first smoothing condenser through said discharge means until the charged voltage of said first smoothing condenser comes to be less than a predetermined voltage, by making said movable contact point into non-conductive state, before the judging operation of the magnitude of said input a-c voltage by said judgment means, thereafter said first smoothing condenser is charged with a rectified output of said first rectifier, and said judgment means decides the magnitude of said input a-c voltage by detecting said d-c voltage which is produced and outputted from said first smoothing condenser with fully charging therein.

17. An air conditioner as defined in the claim 16, wherein said inverter is used as said discharge means, and the accumulated electric charge of said first smoothing condenser is discharged through said inverter and said electric motor by driving on and off said inverter at an arbitrary commutation rate.

18. An air conditioner as defined in the claim 16, further comprising a d-c electric power source for making the control circuit operative; wherein said d-c electric power source comprises:

a second rectifier for rectifying said input ac voltage and being able to be selected in different constructions between a voltage doubler rectifier and a full-wave rectifier;

a second smoothing condenser for smoothing the rectified output from said second rectifier and for producing and outputting a second d-c voltage; and a transformer circuit for converting the second d-c voltage into plural kinds of arbitrary voltage, wherein the selection in the construction of said second rectifier is selected to be said voltage doubler rectifier or said full-wave rectifier, is made depending on a result of the judgment of said judgment means.

19. An air conditioner comprising:

a compressor for compressing refrigerant;

an interior heat exchanger into which the refrigerant is flown from said compressor;

an auxiliary interior heat exchanger which is positioned at down flow side of said interior heat exchanger in the refrigerant flow under heating operation;

an electric motor for driving said compressor; and an electric motor driving apparatus for supplying an a-c voltage to said electric motor to drive, wherein said electric motor driving apparatus comprises:

an electric power converter having a rectifier for rectifying an input a-c voltage and a first switch element for turning on and off of the rectified output of said rectifier to control the voltage;

an inverter for inputting said voltage-controlled output voltage, and having a second switch element for exchanging the input voltage into an a-c voltage by commutation, thereby driving the electric motor with the a-c voltage; and a control means for performing a conduction rate control in on and off of said first switch element, a commutation control of said second switch element, and a chopper control of the commutation current; wherein said control means comprises:

means for maintaining the output voltage at an constant by controlling the conduction rate of on and off of said first switch element and driving the electric motor with the output voltage obtained by chopper controlling the commutation current of the second switch element, if the revolution number of said electric motor is less than a predetermined revolution number; and means for increasing the conduction rate of on and off of said first switch element higher than the conduction rate when maintaining the output voltage at the constant, and driving the electric motor with the output voltage obtained without chopper controlling the commutation current of the second switch element, if the revolution number of said electric motor exceeds the predetermined revolution number.

20. An air conditioner as defined in the claim 19, wherein said interior auxiliary heat exchanger is positioned via a space of a range between 1 mm and 5 mm from said interior heat exchanger.

21. An air conditioner as defined in the claim 19, wherein said electric power converter has a smoothing means for outputting a d-c voltage by smoothing a rectified output which is controlled in voltage by turning on and off the rectified output from said rectifier with said first switch element of said electric power converter through a reactor, and the d-c voltage generated by said smoothing means is outputted to the second switch element of the inverter.

22. An air conditioner comprising:

a compressor for compressing refrigerant;

an interior heat exchanger into which the refrigerant is flown from said compressor;

an auxiliary interior heat exchanger which is positioned at down flow side of said interior heat exchanger in the refrigerant flow under heating operation;

an electric motor for driving said compressor; and an electric motor driving apparatus for supplying an a-c voltage to said electric motor to drive, wherein said electric motor driving apparatus comprises:

an electric power converter having a rectifier for rectifying an input a-c voltage and a first switch element for turning on and off of the rectified output of said rectifier to control the voltage;

an inverter for inputting said voltage-controlled output voltage, and having a second switch element for exchanging the input voltage into an a-c voltage by commutation, thereby driving the electric motor with the a-c voltage; and a control means for performing a conduction rate control in on and off of said first switch element, a commutation control of said second switch element, and a chopper control of the commutation current; wherein said control means comprises:

means for driving the electric motor with the output voltage obtained by chopper controlling the commutation current of the second switch element, if the revolution number of said electric motor is less than a predetermined revolution number; and means for driving the electric motor with the output voltage which is obtained by controlling the conduction rate of on and off of said first switch element corresponding to the revolution number of the electric motor and with the conduction rate of 100% of a commutation cycle of said second switch element, if the revolution number of said electric motor exceeds the predetermined revolution number.

23. An air conditioner comprising:

an electric power converter having a rectifier for rectifying an input a-c voltage and a first switch element for turning on and off of the rectified output of said rectifier to control the voltage;

an inverter for inputting said voltage-controlled output voltage, and having a second switch element for exchanging the input voltage into an a-c voltage by commutation, thereby driving the electric motor with the a-c voltage; and a control means for performing a conduction rate control in on and off of said first switch element, a commutation control of said second switch element, and a chopper control of the commutation current; wherein said control means comprises:

means for maintaining the output voltage at an constant by controlling the conduction rate of on and off of said first switch element and driving the electric motor with the output voltage obtained by chopper controlling the commutation current of the second switch element, if the revolution number of an electric motor is less than a predetermined revolution number; and means for increasing the conduction rate of on and off of said first switch element higher than the conduction rate when maintaining the output voltage at the constant, and driving the electric motor with the output voltage obtained without chopper controlling the commutation current of the second switch element, if the revolution number of said electric motor exceeds the predetermined revolution number.

24. An air conditioner as defined in the claim 23, wherein said electric power converter has a smoothing means for outputting a d-c voltage by smoothing a rectified output which is controlled in voltage by turning on and off the rectified output from said rectifier with said first switch element of said electric power converter through a reactor, and the d-c voltage generated by said smoothing means is outputted to the second switch element of the inverter.

25. An air conditioner comprising:

an electric power converter having a rectifier for rectifying an input a-c voltage and a first switch element for turning on and off of the rectified output of said rectifier to control the voltage;

an inverter for inputting said voltage-controlled output voltage, and having a second switch element for exchanging the input voltage into an a-c voltage by commutation, thereby driving the electric motor with the a-c voltage; and a control means for performing a conduction rate control in on and off of said first switch element, a commutation control of said second switch element, and a chopper control of the commutation current; wherein said control means comprises:

means for driving the electric motor with the output voltage obtained by chopper controlling the commutation current of the second switch element, if the revolution number of an electric motor is less than a predetermined revolution number; and means for driving the electric motor with the output voltage which is obtained by controlling the conduction rate of on and off of said first switch element corresponding to the revolution number of the electric motor and with the conduction rate of 100% of a commutation cycle of said second switch element, if the revolution number of said electric motor exceeds the predetermined revolution number.

* * * * *